(12) United States Patent
Pollara

(10) Patent No.: US 9,177,051 B2
(45) Date of Patent: Nov. 3, 2015

(54) METHOD AND SYSTEM FOR PERSONAL INFORMATION EXTRACTION AND MODELING WITH FULLY GENERALIZED EXTRACTION CONTEXTS

(75) Inventor: Victor J. Pollara, Dickerson, MD (US)

(73) Assignee: Noblis, Inc., Falls Church, VA (US)

( * ) Notice: Subject to any disclaimer, the term of this patent is extended or adjusted under 35 U.S.C. 154(b) by 106 days.

(21) Appl. No.: 13/088,570

(22) Filed: Apr. 18, 2011

(65) Prior Publication Data

US 2011/0258213 A1 Oct. 20, 2011

Related U.S. Application Data

(63) Continuation of application No. 11/976,818, filed on Oct. 29, 2007, now Pat. No. 7,949,629.

(60) Provisional application No. 60/855,112, filed on Oct. 30, 2006.

(51) Int. Cl.
*G06F 17/30* (2006.01)

(52) U.S. Cl.
CPC ................ *G06F 17/30731* (2013.01)

(58) Field of Classification Search
CPC .......... G06F 17/30864; G06F 17/2775; G06F 17/30696; G06F 11/2257; G06F 17/2785; G06F 17/30699; G06F 17/30713; G06F 17/277; G06F 17/2795
See application file for complete search history.

(56) References Cited

U.S. PATENT DOCUMENTS

| | | | |
|---|---|---|---|
| 4,868,733 A | 9/1989 | Fujisawa et al. | |
| 5,386,556 A | 1/1995 | Hedin et al. | |
| 5,404,514 A * | 4/1995 | Kageneck et al. | ............. 1/1 |
| 5,598,519 A | 1/1997 | Narayanan | |
| 5,619,709 A | 4/1997 | Caid et al. | |
| 5,632,009 A | 5/1997 | Rao et al. | |
| 5,659,724 A | 8/1997 | Borgida et al. | |
| 5,675,710 A | 10/1997 | Lewis | |
| 5,794,178 A | 8/1998 | Caid et al. | |
| 5,880,742 A | 3/1999 | Rao et al. | |
| 5,883,635 A | 3/1999 | Rao et al. | |
| 5,983,237 A | 11/1999 | Jain et al. | |
| 6,038,560 A * | 3/2000 | Wical | ............. 1/1 |
| 6,085,202 A | 7/2000 | Rao et al. | |
| 6,154,213 A | 11/2000 | Rennison et al. | |
| 6,363,378 B1 | 3/2002 | Conklin et al. | |

(Continued)

FOREIGN PATENT DOCUMENTS

WO    WO 02/10980 A1    2/2002

OTHER PUBLICATIONS

Nan Zhou et al, "Automatic Acquisition of Linguistic Patterns for Conceptual Modeling" 2004, pp. 1-19.*

(Continued)

*Primary Examiner* — Angelica Ruiz
(74) *Attorney, Agent, or Firm* — Morrison & Foerster LLP

(57) ABSTRACT

Systems and methods for modeling information from a set of documents are disclosed. A tool allows a user to model concepts of interest and extract information from a set of documents in an editable format. The extracted information includes a list of instances of a document from the set of documents that contains the selected concept. The user may modify the extracted information to create subsets of information, add new concepts to the model, and share the model with others.

17 Claims, 34 Drawing Sheets

(56) References Cited

U.S. PATENT DOCUMENTS

| | | | |
|---|---|---|---|
| 6,453,312 B1 | 9/2002 | Goiffon et al. | |
| 6,453,315 B1 | 9/2002 | Weissman et al. | |
| 6,519,588 B1 | 2/2003 | Leschner | |
| 6,556,982 B1* | 4/2003 | McGaffey et al. | 706/50 |
| 6,560,580 B1 | 5/2003 | Fraser et al. | |
| 6,628,312 B1 | 9/2003 | Rao et al. | |
| 6,629,081 B1 | 9/2003 | Cornelius et al. | |
| 6,665,662 B1 | 12/2003 | Kirkwood et al. | |
| 6,675,159 B1 | 1/2004 | Lin et al. | |
| 6,694,329 B2 | 2/2004 | Murray | |
| 6,795,825 B2 | 9/2004 | Rishe | |
| 6,801,229 B1 | 10/2004 | Tinkler | |
| 6,816,857 B1 | 11/2004 | Weissman et al. | |
| 6,868,525 B1* | 3/2005 | Szabo | 715/738 |
| 6,931,604 B2 | 8/2005 | Lane | |
| 6,970,881 B1 | 11/2005 | Mohan et al. | |
| 6,976,020 B2 | 12/2005 | Anthony et al. | |
| 6,978,274 B1* | 12/2005 | Gallivan et al. | 1/1 |
| 6,990,238 B1* | 1/2006 | Saffer et al. | 382/224 |
| 6,990,480 B1 | 1/2006 | Burt | |
| 7,062,705 B1 | 6/2006 | Kirkwood et al. | |
| 7,146,349 B2 | 12/2006 | Benitez-Jimenez et al. | |
| 7,167,844 B1 | 1/2007 | Leong et al. | |
| 7,242,406 B2 | 7/2007 | Robotham et al. | |
| 7,251,637 B1 | 7/2007 | Caid et al. | |
| 7,890,533 B2 | 2/2011 | Pollara | |
| 8,126,826 B2 | 2/2012 | Pollara et al. | |
| 2002/0015042 A1 | 2/2002 | Robotham et al. | |
| 2002/0049705 A1 | 4/2002 | Haviv-Segal et al. | |
| 2002/0069221 A1 | 6/2002 | Rao et al. | |
| 2002/0078090 A1 | 6/2002 | Hwang et al. | |
| 2002/0103775 A1 | 8/2002 | Quass et al. | |
| 2002/0107827 A1 | 8/2002 | Benitez-Jimenez et al. | |
| 2002/0129015 A1* | 9/2002 | Caudill et al. | 707/6 |
| 2002/0178155 A1* | 11/2002 | Sakurai | 707/3 |
| 2002/0198885 A1 | 12/2002 | Streepy, Jr. | |
| 2003/0007002 A1 | 1/2003 | Hida et al. | |
| 2003/0014442 A1 | 1/2003 | Shiigi et al. | |
| 2003/0050915 A1 | 3/2003 | Allemang et al. | |
| 2003/0069908 A1 | 4/2003 | Anthony et al. | |
| 2003/0083767 A1 | 5/2003 | Karlsberg | |
| 2003/0115191 A1* | 6/2003 | Copperman et al. | 707/3 |
| 2003/0123737 A1 | 7/2003 | Mojsilovic et al. | |
| 2003/0131338 A1 | 7/2003 | Georgalas | |
| 2003/0139920 A1* | 7/2003 | Abir | 704/2 |
| 2003/0163366 A1 | 8/2003 | Taft | |
| 2003/0171910 A1* | 9/2003 | Abir | 704/1 |
| 2003/0182281 A1 | 9/2003 | Wittkowski | |
| 2003/0217335 A1 | 11/2003 | Chung et al. | |
| 2004/0049522 A1 | 3/2004 | Streepy, Jr. | |
| 2004/0088308 A1 | 5/2004 | Bailey et al. | |
| 2004/0111408 A1 | 6/2004 | Caudill et al. | |
| 2004/0123237 A1* | 6/2004 | Lin et al. | 715/513 |
| 2005/0010555 A1* | 1/2005 | Gallivan | 707/2 |
| 2005/0021397 A1* | 1/2005 | Cui et al. | 705/14 |
| 2005/0055365 A1 | 3/2005 | Ramakrishnan et al. | |
| 2005/0075832 A1 | 4/2005 | Ikeguchi et al. | |
| 2005/0132284 A1 | 6/2005 | Lloyd et al. | |
| 2005/0138556 A1 | 6/2005 | Brun et al. | |
| 2005/0140694 A1 | 6/2005 | Subramanian et al. | |
| 2005/0154701 A1 | 7/2005 | Parunak et al. | |
| 2005/0171760 A1 | 8/2005 | Tinkler | |
| 2005/0177805 A1* | 8/2005 | Lynch et al. | 715/968 |
| 2005/0182764 A1 | 8/2005 | Evans | |
| 2005/0187913 A1* | 8/2005 | Nelken et al. | 707/3 |
| 2005/0192926 A1 | 9/2005 | Liu et al. | |
| 2005/0209983 A1* | 9/2005 | MacPherson | 707/1 |
| 2005/0210009 A1 | 9/2005 | Tran | |
| 2005/0220351 A1 | 10/2005 | Vanderwende et al. | |
| 2005/0256892 A1 | 11/2005 | Harken | |
| 2005/0262053 A1 | 11/2005 | Liou et al. | |
| 2005/0278321 A1 | 12/2005 | Vailaya et al. | |
| 2005/0278362 A1* | 12/2005 | Maren et al. | 707/100 |
| 2005/0289102 A1 | 12/2005 | Das et al. | |
| 2006/0015486 A1* | 1/2006 | Nomiyama et al. | 707/3 |
| 2006/0047649 A1* | 3/2006 | Liang | 707/4 |
| 2006/0089947 A1* | 4/2006 | Gallivan et al. | 707/102 |
| 2006/0106793 A1* | 5/2006 | Liang | 707/5 |
| 2006/0123000 A1 | 6/2006 | Baxter et al. | |
| 2006/0136589 A1 | 6/2006 | Konig et al. | |
| 2006/0136805 A1 | 6/2006 | Conn et al. | |
| 2006/0179051 A1 | 8/2006 | Whitney et al. | |
| 2006/0184566 A1 | 8/2006 | Lo et al. | |
| 2006/0195461 A1 | 8/2006 | Lo et al. | |
| 2006/0200763 A1 | 9/2006 | Michaelsen et al. | |
| 2007/0073748 A1 | 3/2007 | Barney | |
| 2008/0010274 A1* | 1/2008 | Carus et al. | 707/5 |

OTHER PUBLICATIONS

Aussenac-Giles et al., "Ontologies as Background Knowledge to Explore Document Collections," *Institut de Recherche en Informatique de Toulouse*, aussenac/mothe@irit.fr., XP-002458536 (14 pages).

Chung et al., "Thematic Mapping—From Unstructured Documents to Taxonomies," *Verity, Inc.*, 2002, pp. 608-610, XP-002458537.

Greenwood et al., "Improving Semi-Supervised Acquisition of Relation Extraction Patterns," *Proceedings of the Workshop on Information Extraction Beyond The Document*, Sydney, Australia, Jul. 2006, pp. 29-35.

Grishman, Information Extraction: Techniques and Challenges, *Lecture Notes in Computer Science* 1299, Spring 1997, pp. 10-27.

Hirschman et al., Overview of BioCreAtivE: Critical Assessment of Information Extraction for Biology, *BMC Bioninformatics*, 2005, vol. 6, Suppl. 1 (10 pages).

Hobbs, "Generic Information Extraction System," TIPSTER Text Program website, www.itl.nist.qov/iaui/894.02/related_projects/tipster/gen_ie.htm (6 pages).

Marshall et al., Convergence of Knowledge Management and E-Learning: The Getsmart Experience, *IEEE*, 2003, pp. 135-146.

Neill, "Meta-Analysis Research Methodology," Web Pages retrieved from en.wikipedia.org and wilderdom.com, Last Updated on May 10, 2006 (11 pages).

Robinson et al., "Overview: Information Extraction from Broadcast News," *In Proc. DARPA Broadcast News Workshop*, 1999, pp. 27-30.

Sheth et al., "Managing Semantic content for the Web," IEEE Internet Computing, Jul.-Aug. 2002, pp. 80-87.

Inxight Enhances Entity Extraction in ThingFinder and ThingFinder Professional, *Inxight Federal Systems*, Web Pages retrieved from www.inxightfedsys.com, 2008 (2 pages).

NetOwl Extractor (Entity Extraction), SRA International, Inc., Sep. 9, 2008, Web Page retrieved from http://www.sra.com/netowl/extractor (1 page).

"Meta-analysis" from Wikipedia, www.en.wikipedia.org/wiki/meta-analysis (accessed Sep. 5, 2008) (3 pages).

International Search Report for PCT/US2007/011256, mailed Nov. 26, 2007 (4 pages).

Notification and International Search Report for PCT/US2008/10935, mailed Nov. 21, 2008 (3 pages).

Written Opinion of the International Searching Authority for PCT/US2008/10935, mailed Nov. 21, 2008 (6 pages).

Office Action, mailed Jun. 19, 2008, in U.S. Appl. No. 11/434,847, filed May 17, 2006 (50 pages).

Final Office Action, mailed Jan. 22, 2009, in U.S. Appl. No. 11/434,847, filed May 17, 2006 (32 pages).

Office Action, mailed Jun. 25, 2009, in U.S. Appl. No. 11/434,847, filed May 17, 2006 (34 pages).

Final Office Action, mailed Jan. 21, 2010, in U.S. Appl. No. 11/434,847, filed May 17, 2006 (35 pages).

Office Action, mailed Jun. 20, 2011, in U.S. Appl. No. 12/234,219, filed Jun. 19, 2008 (11 pages).

Clemente, Bernadette E. and Pollara, Victor J., "Mapping the Course, Marking the Trail," IT Pro, Nov./Dec. 2005, pp. 10-15, IEEE Computer Society.

Inxight Software, Inc., "Inxight Thingfinder® Professional SDK," datasheet, 1 page, 2005, www.inxight.com/pdfs/ThingFinder_Pro.pdf.

Inxight Software, Inc., "Inxight Enhances Entity Extraction in ThingFinder, Adds Fact Extraction to ThingFinder Professional,"

(56) References Cited

OTHER PUBLICATIONS news release, PR Newswire Association LLC, 3 pages, Mar. 7, 2006, http://www.prnewswire.com/cgi-bin/stories.pl?ACCT=104&STORY=/www/story/03-07-2006/0004314719&EDATE.

Inxight Software, Inc. and Visual Analytics, Inc., "Inxight and Visual Analytics Partner to Tag and Visualize Unstructured Data for Government Operations," Press Release, 2 pages, Aug. 2, 2006, http://www.visualanalytics.com/media/PressRelease/2006-08-02-prnews.html.

Pekar, Viktor, et al., "Categorizing Web Pages as a Preprocessing Step for Information Extraction," Computational Linguistics Group, HLSS, Univ. of Wolverhampton, U.K., (2004) 4 pages.

Virginia Tech Department of Entomology, "Concept Map Tool Handout," Nov. 5, 2004, 11 pages.

L&C Global, "Language and Computing Demo," 1 page, Oct. 22, 2007, http://www.landcglobal.com/demo/demo.html.

Terje Brasethvik & Jon Atle Gulla, Natural Language Analysis for Semantic Document Modeling, 2001, Springer-Verlag, pp. 127-140.

International Search Report for PCT/US2007/082340 (mailed Jul. 1, 2008) (6 pages).

Written Opinion of the International Searching Authority for PCT/US2007/082340 (mailed Jul. 1, 2008) (8 pages).

Moskovitch, Robert, et al., "Vaidurya—A Concept-Based, Context-Sensitive Search Engine for Clinical Guidelines," MEDINFO, vol. 11, No. 1, 2004, pp. 140-144 (5 pages).

Brasethvik, Terje, et al., "Semantically accessing documents using conceptual model descriptions," Lecture Notes in Computer Science, Springer Verlag, Berlin, DE, vol. 1727, Jan. 1, 1999, pp. 1-15 (15 pages).

Sheth, Amit, et al., "Managing Semantic Content for the Web," IEEE Internet Computing, IEEE Service Center, New York, NY, vol. 6, No. 4, Jul. 1, 2002, pp. 80-87, (8 pages).

Giger, H. P. (Edited by Chiaramella, Yves), "Concept Based Retrieval in Classical IR Systems," Proceedings of the International Conference on Research and Development in Information Retrieval, Grenoble-France, vol. conf. 11, Jun. 13, 1988, pp. 275-289 (16 pages).

Written Opinion of the International Searching Authority for PCT/US2007/082340 (mailed May 5, 2009) (7 pages).

Terje Brasethvik et al., "Semantically accessing documents using conceptual model descriptions," Lecture Notes in Computer Science, Springer Verlag, Berlin, DE, vol. 1727, Jan. 1, 1999, pp. 321-333, XP002458535 ISSN: 0302-9743 (13 pages).

\* cited by examiner

METHOD AND SYSTEM FOR PERSONAL INFORMATION EXTRACTION AND MODELING WITH FULLY GENERALIZED EXTRACTION CONTEXTS

RELATED APPLICATIONS

This application is a continuation of U.S. patent application Ser. No. 11/976,818, filed Oct. 29, 2007, now U.S. Pat. No. 7,949,629 and claims the benefit of the filing date of U.S. Provisional Application No. 60/855,112, filed Oct. 30, 2006, titled "Method and System for Personal Information Extraction and Modeling," of Victor J. Pollara, both of which are incorporated their entirety herein by reference.

FIELD

The present invention relates generally to information extraction, and more particularly, to methods and systems for extracting information from a collection of documents and modeling the extracted information using customized tools.

BACKGROUND

Today, there exists a rising flood of data and a drought of actionable information. People are experiencing information overload from the Internet, search engines, digital libraries (e.g., PubMed™), enterprise databases (e.g., electronic case files), and even personal desktops. There exists the need for a tool that may organize, aggregate, model, and analyze information, as well as provide ways for people to use the knowledge gained. For example, many researchers need to share, leverage, retain, and re-use information retrieved from a search. Accordingly, there exists the need for a personal information extraction and modeling ("PIEM") tool that may transform a labor intensive, manual, many-time process into an efficient, flexible process.

SUMMARY

A piece of text may have different meanings, depending on the context in which it is found. For example, when a sports announcer discusses a "lowball," he is probably talking about something different than a real estate agent discussing a "lowball." Also, within a single document, meaning and possible relevance of a concept may be different in different sections of the document.

There exists the need for a tool for extracting and interpreting concepts differently on the basis of their context in a document. For example, in a news article about a governor, the only thing that may be relevant to a reader is the governor's position on a cigarette tax, so the user may only want to locate and extract those parts of the article that pertain to the governor's position on that tax and disregard the rest. In a medical journal article, mention of Type 2 diabetes has differing degrees of importance, depending on which context it appears.

Combining the power of visual modeling with information extraction, as described in U.S. application Ser. No. 11/434,847, entitled "Method and System for Information Extraction and Modeling," filed May 17, 2006 and incorporated herein by reference ("the '847 application"), opens the opportunity to use concept-based extraction and modeling in a way to concisely control both the terms that are being sought, and the context in which they are sought. PIEM technology (which may also be called personal knowledge extraction and management technology, or "PKEM" technology) can provide a populist home for extraction techniques that, to date, have remained in the world of specialists and academics. Specifically, a PIEM tool may allow extraction and modeling of concepts including a pattern (i.e., what the user is looking for) and/or a context (i.e., where to look for the pattern). For example, a pattern may include: a set of terms, a group of concepts combined by a relationship, boolean or other combinations of concepts, or syntactic or linguistic groupings. A concept may include: a set of documents, a set of sentences or other syntactically defined text blocks, a set of linguistically defined text blocks, a set of metadata, a set of text fragments identified by an existing concept, or a set of manually defined text fragments.

The core concepts of the PIEM tool are so compelling that ultimately every document management tool may incorporate its functionalities to enhance users' ability to read, understand, reason with, and act upon information in their documents. Other search tools, as they exist today, are simply not enough, and in the future, will not be the last computer-aided step in a user's reading of documents.

PIEM may be embodied in stand-alone tools, as well as in extensions to existing tools and services, such as, for example, today's search engines (web and enterprise-based), existing knowledge management products, document management tools, libraries and other on-line services, trade-focused databases such as PubMed™, LexisNexis™, IEEE Digital Library™, Wikipedia™, Answers.com™, and other general web information sources, or in enterprise libraries and data warehouses.

PIEM technology goes beyond any single specific tool, in the sense that it creates a new class of exchangeable objects that potentially have high value—namely, models. Users may still enter keywords in web-based search services such as Yahoo!™ or Google™, but using PIEM technology, they may also enter models and expect the service to return a set of documents well-matched to the model. Conversely, after a search, a user may receive not just a list of links, but also a list of suggested models that match the documents (e.g., by some relevant calculation).

Web-based services may also serve as exchanges for models. Publishers may provide not only a subscription to their journals, but also offer libraries of curated models on the subjects covered by their publications. News outlets may provide sets of news articles on specific topics, together with models that make it easy to "power-read" the set of articles. Whereas currently available technology may require expensive systems and trained model-building experts to build useful models, PIEM opens the door to any domain expert or non-expert (such as a biologist, historian, political scientist, hobbyist, etc.) to engage in model building and sharing.

All manner of models (e.g., maps, timelines, diagrams, flowcharts, circuits, biological depictions, etc.) may be pluggable and immediately useable and modifiable. PIEM technology also makes use of first class natural language processing and part of speech tagging, and may recognize every common file type and special purpose file type. PIEM technology has intelligent n-gram analysis and concept clustering, and a pluggable interface for all manner of thesauri, lexica, and other domain-specific resources. It may also include a rich suite of post-processing functionality that allows a user to easily craft decision logic and otherwise make analytical use of information. It may include a full fledged visualization capability to view results of extractions and analyses, and may be configurable as either a stand-alone tool or as a shared, server-based enterprise productivity tool (e.g., an add-on to existing knowledge management suites).

As an example, a hobbyist building a personal encyclopedic resource on his or her subject of interest (this could also be a person with a health issue, who desperately wants to know everything that is known about the condition) may use the PIEM tool. Similarly, non-science authors and scientists writing articles and books (with access to electronic copies of their resource documents) may use the PIEM tool to cross-reference and tag source materials. Journalists may use the PIEM tool to organize news feeds relevant to a subject they are working on. Consultants or experts regularly tasked with developing white papers on specific subjects may use it to not only explore a body of literature, but also to aggregate facts across documents and vet the reliability and utility of the information. Lawyers may use the PIEM tool for custom modeling of the content of legal, business, and technology documents. Students might use the PIEM tool for work on a large project that requires rapidly digesting a large body of literature and making intelligent use of the information. As another example, investors who want to study a particular area would want not only business news, but also information about their product or service and the products or services of competitors, as well as the underlying technology if the product embodies an emerging technology.

Methods consistent with embodiments of the invention model information from a set of documents. A set of concepts and corresponding extractors are imported, and a model including representations of the concepts is created. Based on a user selection of the representation of a first concept, information related to the first concept is extracted from the set of documents using the corresponding extractor, and the extracted information is displayed in a format that is editable by the user.

Methods consistent with embodiments of the invention allow for personalizing a model of information. A set of documents is downloaded, and a model containing concepts and corresponding extractors is received. Information related to the concepts is extracted from the set of documents using the corresponding extractors. Based on the extracted information, an additional concept for the model is defined to include at least two of the concepts in the model occurring in a context.

Methods consistent with embodiments of the invention allow for annotating a set of documents in a model of information. A set of documents is downloaded, and a model containing concepts and corresponding extractors is received. Information related to the concepts is extracted from the set of documents using the corresponding extractors. A definition for a function to calculate the status of a document in the set of documents is received. After extracting information, a document in the set of documents is automatically annotated based on the definition.

Methods consistent with embodiments of the invention allow for modeling information from a set of documents. A set of concepts and corresponding extractors is imported, and a model including representations of the concepts is created. Based on a user selection of a representation of a first concept, information related to the first concept is extracted from the set of documents using the corresponding extractor. The time of extraction of information is stored, and the extracted information is displayed in a format that is editable by the user.

Other embodiments of the invention provide a system for modeling information from a set of documents, comprising a importing component configured to import a set of concepts and corresponding extractors; a modeling component configured to create a model including representations of the concepts; an extraction component configured to extract information, based on a user selection of a representation of a first concept, related to the first concept from the set of documents using the corresponding extractor; a database configured to store the time of extraction of information; and a display component configured to displaying the extracted information in a format that is editable by the user.

BRIEF DESCRIPTION OF THE DRAWINGS

FIGS. 4-34 illustrate exemplary user interface displays consistent with an embodiment of the present invention.

DETAILED DESCRIPTION

Figure 1:
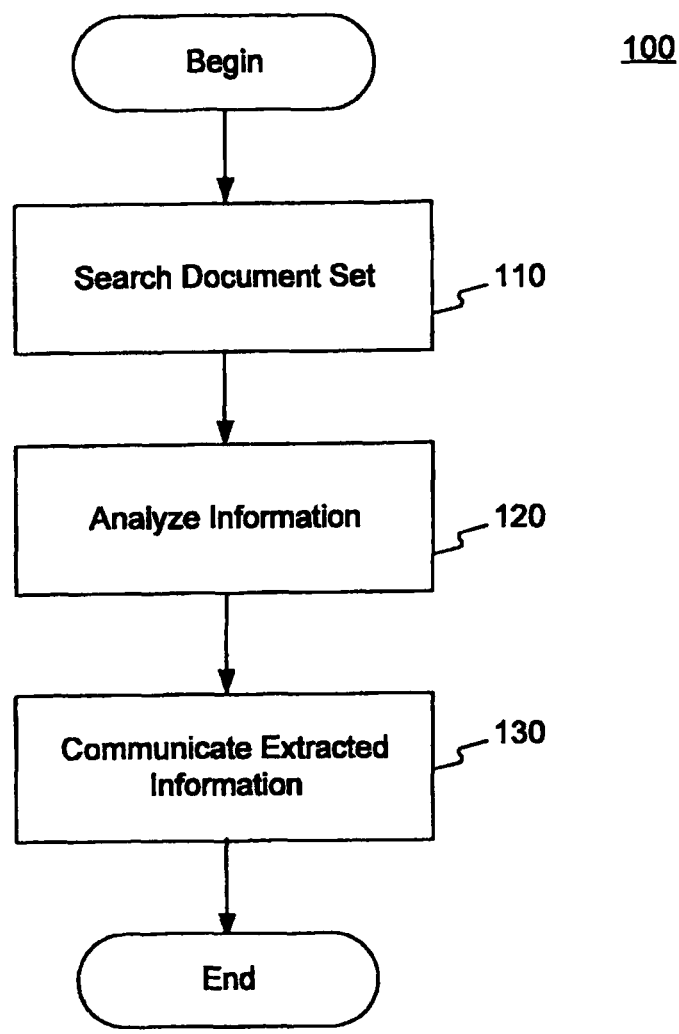
FIG. 1 is a flow diagram of an exemplary process to extract and model information consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention.

FIG. 1 is a flow diagram of an exemplary process 100 that may be used to extract and model information consistent with an embodiment of the present invention. As shown in FIG. 1, a user may search within a document set (step 110), for example using systems and methods described in the '847 application. For example, a user may locate relevant text documents within a document set downloaded from a database such as PubMed™. Next, the user may analyze the information (step 120) to understand the documents. A PIEM tool consistent with embodiments of the present invention (as described in more detail below with respect to FIG. 2) may provide for concept-based extraction, concept modeling, automated text linking, information visualization, pruning and sub-setting, annotations, ranking, shareable models, exportable databases, and incremental updates, among other features. The user may communicate any extracted information with others (step 130), for example by sharing a model, documents, or information extracted from the documents.

In one example, the Army Corps of Engineers may want to know what work a certain company has done for the Army Corps of Engineers in the past and may ask questions of the company such as: who has experience, who are experts in the field, etc. A manager for the company may create various concepts using the PIEM tool, and may extract information to answer the questions. For example, to represent the Army Corps of Engineers, the manager may create a concept for "Army Corps of Engineers," using variations of words that may represent "Army Corps of Engineers," and may associate the concept with various text strings, such as "Corps," "COE," Army COE," etc. The PIEM tool may then return information related to that concept (e.g., return all occurrences of those text strings.) Similarly, the manager may create and combine concepts to represent the academic degrees of its employees and the timing of certain projects to determine, for example, which individuals are currently working on projects related to the Army Corps of Engineers, and what their education level is. Combining concepts in this way may allow for complex concept creation.

Figure 2:
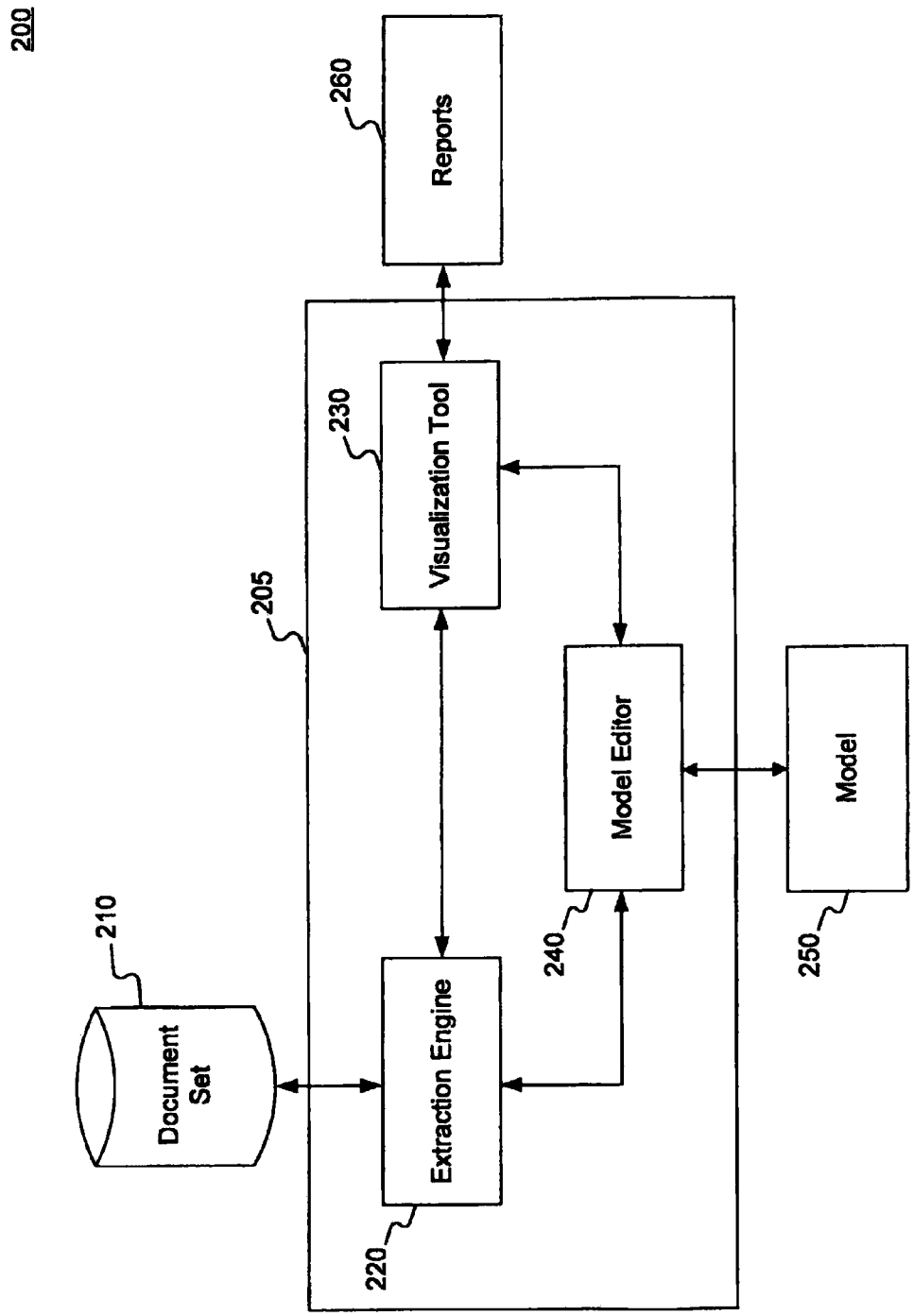
FIG. 2 is a diagram of components in an exemplary information extraction and modeling system consistent with an embodiment of the present invention.

FIG. 2 is a diagram of components in an exemplary information extraction and modeling system 200 consistent with an embodiment of the present invention. As shown in FIG. 2, a personal knowledge extraction and modeling ("PIEM") tool 205 may include an extraction engine 220, a visualization tool 230, and a model editor 240. PIEM tool 205 may, in certain embodiments, include a graphical user interface, document processing tools, and may allow for model import and export, as well as management of models, concepts, analysis, results, and document sets. One skilled in the art will recognize that any combination of extraction engines 220, visualization tools 230, and/or model editors 240 may be used in PIEM tool 205, and that each component in system 200 may be separate or combined. For example, in certain embodiments, document set 210 or model 250 may be included in tool 205.

Extraction engine 220 may access a set of documents 210, for example using a database. Document set 210 may include a set of text documents from a user's personal desktop, paper documents that have been scanned into electronic format, or information downloaded from the Internet or other databases, for example. One skilled in the art will recognize that document set 210 may include any set of text, graphics, source code, or other information. For example, document set 210 may include audio files, such as recordings of conversations. Using speech recognition software, extraction software in extraction engine 220 may recognize emotion in speech quality. The user may create concepts that are text based, or concepts that may include audio clips. As another example, document set 210 may include music recordings, and extraction processes for the music recordings may include clips of music, musical phrases, or parts of compositions. As yet another example, document set 210 may include video files, such as MPEG files.

Extractors used in extraction engine 220 may include the features of the examples described above (e.g., musical phrases or audio clips), as well as features specifically designed to find the kinds of visuals used in the "cutting room" (e.g., close-ups, people, background, speed, lighting, etc.) Additionally, extraction engine 220 may make an n-gram determination using document set 210, and may perform syntactic analysis, lexical analysis, and simple statistical analysis, as well as other processes using document set 210, for example as described in more detail in the '847 application. PIEM tool 205 may associate an extraction process with each concept.

Extraction Patterns

Aside from extractors for specialized resources (e.g., MPEG), there is no technical limitation on the sophistication of an extraction pattern or process used by extraction engine 220. Extraction patterns may be created from hidden Markov models, statistical approaches, machine learning plug-ins, etc. As an example, the label "bread" may be used to represent different concepts in different contexts. To formalize the connection between concepts and extraction, a user may include the context he is working in. Assuming R is a set of information resources $\{r_i\}$ (e.g. documents), and C is a context found in an information resource (e.g. title, abstract), one may associate with concept K, the extraction process, $X_K$ that is applied to each $(r_i, C)$ pair. Let (R:C) represent the set of $(r_i, C)$ pairs.

X is an algorithm that identifies the instances of K within C in each $r_i \in R$ if they exist. The result of executing the process $X_K$ on (R:C) is another set of "resource-context" pairs:

$$R:C \xrightarrow{X_K} R_K:C_K$$

One of the most fundamental constructs available in set theory is the Cartesian product. There are many natural and useful constructs that are defined in terms of products. Given an ordered pair of concepts $(K_1, K_2)$, associated with a pair of extraction processes $((R_1:C_1), X_{K1}), ((R_2:C_2), X_{K2}))$, employing both extractors gives rise to the ordered pair $((R_{K1}:C_{K1}), (R_{K2}:C_{K2}))$.

Boolean Operations

Boolean operations may be used to create extraction patterns. What is the concept "$K_1$ & $K_2$"? Intuitively, it means that both concepts appear in the same context. Let concepts $K_1$, $K_2$, be associated with a pair of extraction processes $((R_1:C_1), X_{K1}), ((R_2:C_2), X_{K2})$, with $(R_1:C_1)=(R_2:C_2)$. Employing both extractors gives rise to the pair of sets $(R_{K1}:C_{K1}), (R_{K2}:C_{K2})$. The natural set-theoretic operation to perform is: $(R_{K1}:C_1) \cap (R_{K2}:C_1)$. This definition of "&", with $(R_1:C_1)=(R_2:C_2)$ is the same as: "collocation within scope $R_1$ and context $C_1$."

Multi-Field Extraction

There is much more one can do with Cartesian products consistent with embodiments of the present invention. As another example, multi-field extraction is possible. If a user looks for a concept like the word "currently" in resumes, an extractor in extraction engine 220 may search for specific fields: (currently)(rest of sentence). Each field is actually a concept in its own right and the extractor is looking for an ordered pair of concepts. Let concepts $K_1$, $K_2$, be associated with extraction processes $((R_1:C_1), X_{K1}), ((R_2:C_2), X_{K2})$ with $(R_1:C_1)=(R_2:C_2)$. A "sequencing" constraint may be imposed. This can be written with a SEQ operator that extracts two concepts in sequence as: $((R_1:C_1), SEQ(X_{K1}, X_{K2}))$.

Multi-Context Extraction

As yet another example, multi-context extraction is possible using extraction engine 220. Given a fixed set of documents, imagine the concept: All (Author, Pubdate, Abstract) triples from documents with: Authorname below M in alphabetical order ($K_1$), Publication date after Dec. 31, 1999 ($K_2$), and Abstract containing "lipitor" ($K_3$). This concept is defined across three different contexts within each document. That is, the component concepts: $K_1$, $K_2$, $K_3$, are associated with a three component extraction process. $((R_1:C_1), X_{K1})$, $((R_2:C_2), X_{K2}), ((R_3:C_3), X_{K3})$, with $R_1=R_2=R_3$, $C_1 \neq C_2 \neq C_3$. There is no sequencing constraint; it is represented as a triple: $((R_1:(C_1, C_2, C_3)), (X_{K1}, X_{K2}, X_{K3}))$ where the extractors are applied component wise.

The Table: A Classic "Multi-Context" Information Resource

The table is an example of a classic multi-context information resource. In one example, a "scope" may be defined as the listing of specific instances of a context, such as the row numbers in a table, and a "context" may be defined as the column definition in the table. In Table 1 below, the scope is the listing of row numbers "1", "2", and "3", and the context is "Novel Titles."

TABLE 1

| Scope | Novel Titles |
| --- | --- |
| 1 | Moby Dick |
| 2 | Tale of Two Cities |
| 3 | 1984 |

A user could specify a subset to create a new concept, such as "$19^{th}$ Century Novel Titles." This new concept "$19^{th}$ Century Novel Titles" includes a different "scope" than that shown in Table 1.

In other words, a table may include n rows and m columns, where each row is an information resource $r_i$. The set of rows may represent a scope $R=\{r_i, i=1, \ldots, n\}$. Each column of the table may represent a separate context, $C_j, j=1, \ldots, m$. For example, $(R:C_3)$ is the scope equal to "all rows", and context is the third column.

How a Concept Defines a Scope and Context

If concept $K_1$ is associated with an extraction process $((R_1: C_1), X_{K1})$, employing an extraction may give rise to the set $(R_{K1}:C_{K1})$. By definition, $(R_{K1}:C_{K1})$ is a "scope/context" pair. So it is possible to define a new concept $K_2$, associated with the process $(R_{K1}:C_{K1}), K_2)$. That is, $K_2$ is defined within the "result" of $K_1$. In certain embodiments, PIEM tool 205 facilitates such "drilldown."

How a Scope and Context Defines a Concept

A set of resources R, and a context C within the resources of R, may define a concept using a minimal extractor necessary to identify C in each $r_i \in R$. The extractor may be trivial, or highly complex, as described in the following example:

1. In a set, R, of raw text documents, with C="whole document", the extractor is a set of whole documents.
2. In a set, R, of HTML pages, with C="HTML title", the extractor retrieves the bytes between the tags <TITLE> and </TITLE>.
3. R is a set of documents, and C is defined by a highly complex, machine-learning algorithm X.
4. If a table with n rows and m columns is viewed as a scope/context pair: $(\{r_{i, i=1, \ldots, n}\}:C_1 \times \ldots \times C_m)$, then the trivial extractor turns the table into a concept.

This observation opens up enormous possibilities for intuitive, user-directed, post-extraction analysis because users may now do to tables of extracted information anything they can do with a spreadsheet, and more.

As shown in FIG. 2, extraction engine 220 may communicate with visualization tool 230. Visualization tool 230 may communicate with model editor 240, which in turn may communicate with extraction engine 220. Model editor 240 may use explicit and implicit concept definitions to build new concepts and edit existing concepts (e.g., using a visual-based editor and capturing user actions), to create, edit, and modify model 250. Model 250 may include, for example, the model(s) described in the '847 application. One skilled in the art will recognize that many means and methods may be used to create model 250. For example, a web page, document, graph, map, table, spreadsheet, flowchart, or histogram may be used to represent model 250.

Visualization tool 230 may allow a user to view, organize, and annotate models 250, concepts, original text from documents 210, results extracted from document set 210, etc. Visualization tool 230 may allow a user to annotate each document with personalized notes, associate these notes with the documents, and store the notes.

In certain embodiments, visualization tool 230 may allow users to build reports 260 to visualize certain results. Reports 260 may include reports known in the art, such as web pages, documents, graphs, maps, tables, spreadsheets, flowcharts, histograms, etc. Further, visualization tool 230 may allow a user to define a simple function to rank documents or to assign them statuses. Visualization tool 230 may allow a user to define functions that depend on one or more fields in a database, and model editor 240 may allow the user to generate a new concept using the function. PIEM tool 205 may associate an entire process (e.g., extraction and post extraction calculation) with a new concept node in model 250 for later use.

Figure 3:
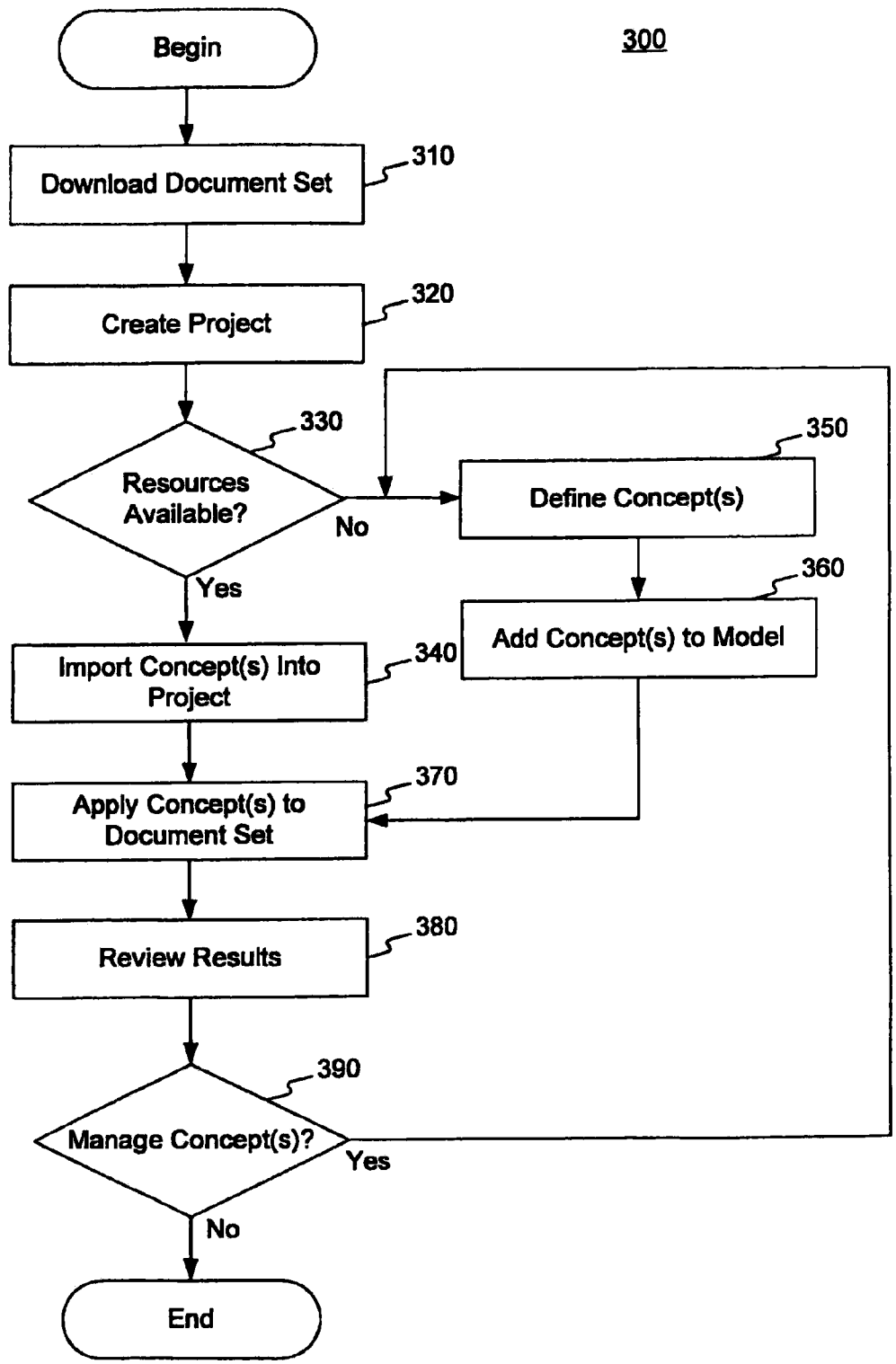
FIG. 3 is a flow diagram of an exemplary process to create and modify models information consistent with an embodiment of the present invention.

FIG. 3 is a flow diagram of an exemplary process 300 that may be used to create and modify models of information consistent with an embodiment of the present invention. Medical experts and researchers often need to consult research literature to find answers for specific questions about medical conditions and their treatments. On any given topic, there may be thousands of clinical trials that address some aspect of that topic. A common first step is to search a medical database, such as National Library of Medicine's PubMed™ or a subscription service such as Ovid™. Typically, a researcher will enter a boolean combination of terms and a search engine will return the abstracts that match those terms. A result of a search of MedLine™, for example, may produce over a thousand entries on the subject of treatments for diabetics. PIEM tool 205 may parse the data produced from the search, and may extract some metadata, such as title and publication date, as well as the abstract of each entry. After such a search has been conducted, as shown in FIG. 3, a user may download results (e.g., all documents, or various combinations of metadata or abstracts).

As shown in FIG. 3, a user may download documents, for example in the form of document set 210 (step 310), to the user's computer, a network drive, a wireless device, other media, etc. The document set may result from a search as described above or may be received from another user, etc. Next, the user may create a new project with document set 210 using PIEM tool 205 (step 320). PIEM tool 205 may upload document set 210 in any format, such as XML, ".txt", ".pdf", ".doc", or ".html", for example.

Next, the user may determine if resources (e.g., other models, concepts, and/or extractors) are available to apply to document set 210 (step 330). If a user has resources available (step 330, Yes), for example if the user received a general model for clinical trials abstracts from a colleague, the user may import at least one concept from that model into the current project (step 340). The user may also import any related extractors into the current project. PIEM tool 205, may, in certain embodiments, automatically import any extractors associated with imported concepts. The extractors may incorporate many different types of search tools such as word frequency vectors, heuristic text summaries, construct frequencies, entity-relations, etc., as described in the '847 application.

If the user has no previous resources (e.g., models, concepts, etc.) that are applicable to document set 210 (step 330, No), the user may choose to begin building a new model, for example by using N-grams extracted from document set 210. For example, the user may define at least one concept (step 350), and add the concept(s) to the model (step 360), as described in more detail below with respect to FIGS. 12-33.

Figure 10:
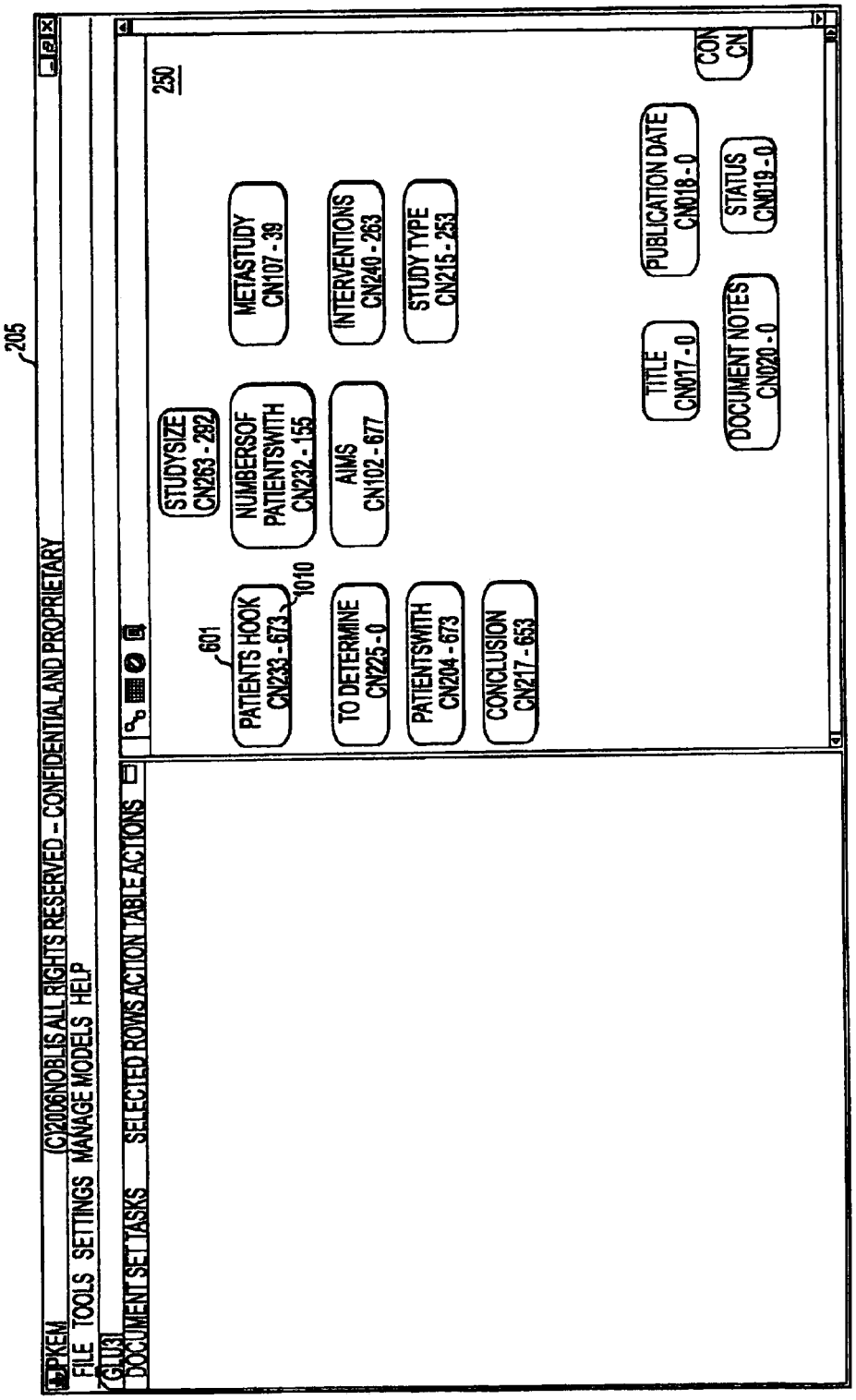

Next, the user may apply the concept(s) to document set 210 (step 370) to extract information, for example using the extraction processes described above with respect to FIG. 3, and to review the results (step 380), as described in more detail below with respect to FIG. 10. The user may at any point continue to manage concepts and revise the model, for example by adding or modifying concepts (step 390, Yes).

Step 320: Create Project

Figure 4:
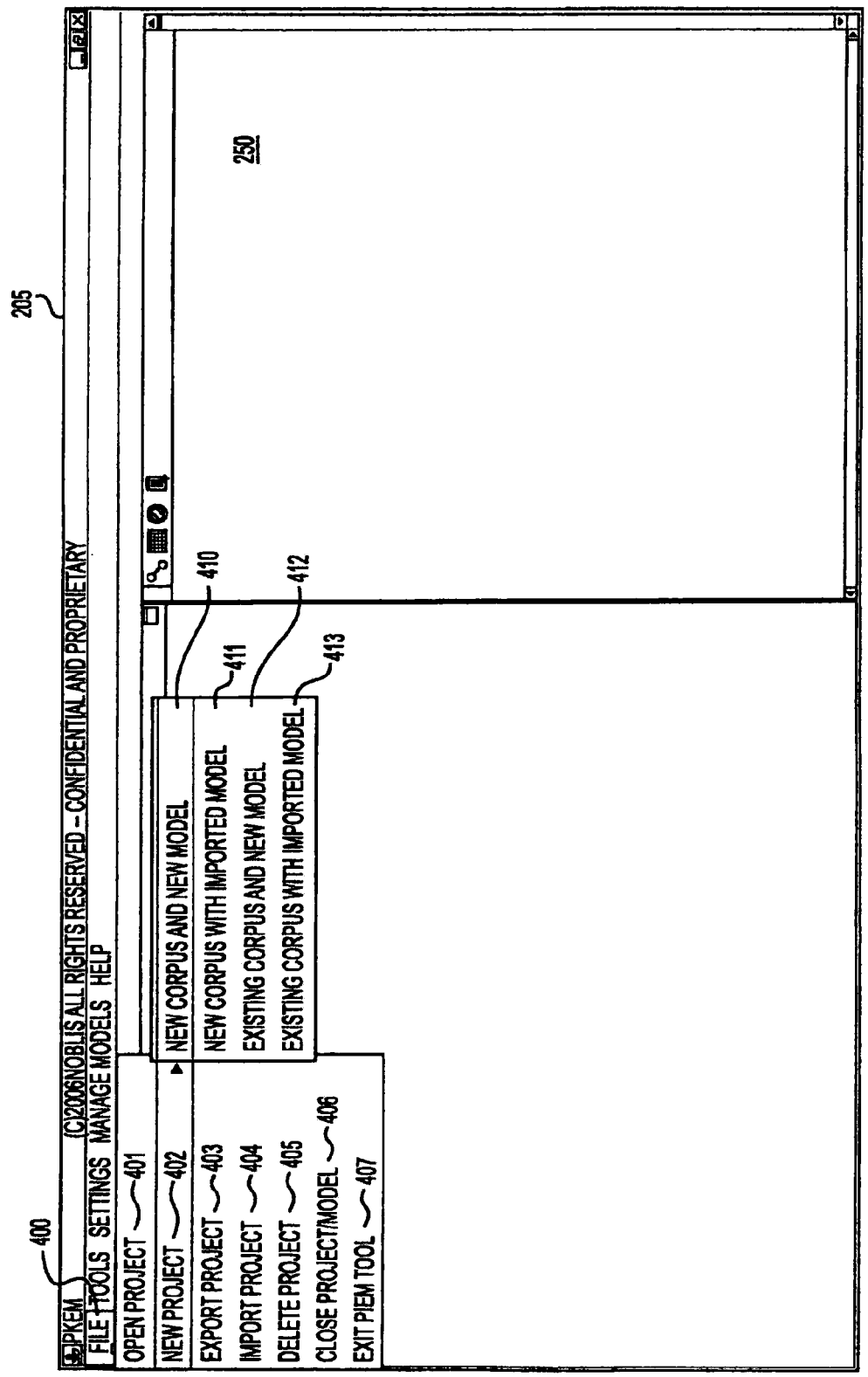

As described above, after downloading document set 210, a user may create a project using PIEM tool 205. FIG. 4 illustrates an exemplary user interface display of PIEM tool 205 consistent with an embodiment of the present invention for creating a new project. PIEM tool 205 may present menu 400 as shown in FIG. 4, which may provide the user with options related to the management and creation of projects and models. As shown in FIG. 4, menu 400 may present various options to the user, such as "Open Project" 401, "New Project" 402, "Export Project" 403, "Import Project" 404, "Delete Project" 405, "Close Project/Model" 406, and "Exit PIEM Tool" 407. Each menu option may also contain various sub-options. For example, as shown in FIG. 4, menu option "New Project" 402 contains sub-options "New Corpus and New Model" 410, "New Corpus with Imported Model" 411, "Existing Corpus and New Model" 412, and "Existing Corpus with Imported Model" 413. One skilled in the art will recognize that the menu options shown in FIG. 4 and in the other figures in this application are merely for illustration, and that menu options may be added to, deleted, or modified without departing the principles of the invention.

Figure 5:
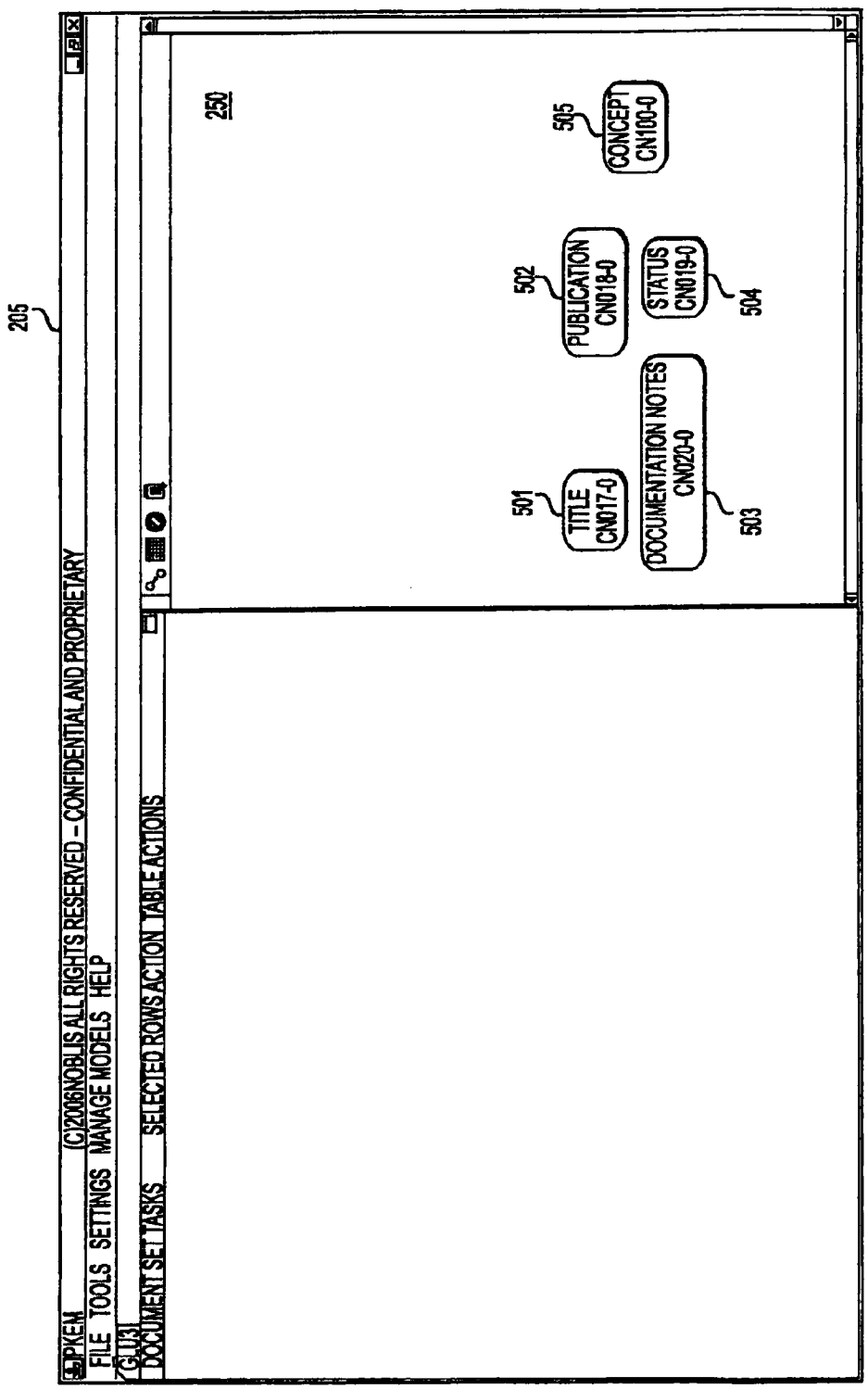

Using PIEM tool 205 and menu 400, the user may create a new project, and an empty model 250 may be displayed. FIG. 5 illustrates an exemplary user interface display consistent with an embodiment of the present invention to display model 250. In the embodiment shown in FIG. 5, PIEM tool 205 may also display several default nodes representing concepts in model 250 (e.g., node "title" 501, node "publication date" 502, node "document notes" 503, node "status" 504, and node "concept" 505). A user may also name its project. For example, in the embodiment shown in FIG. 5, the user names the project "glu3." In one embodiment, after creating a new project, PIEM tool 205 may run an n-gram analysis on document set 210, and process each document in document set 210 with a part-of-speech tagger, as described in more detail in the '847 application.

Steps 330-340: Import Concept into Project using Available Resources

Figure 6:
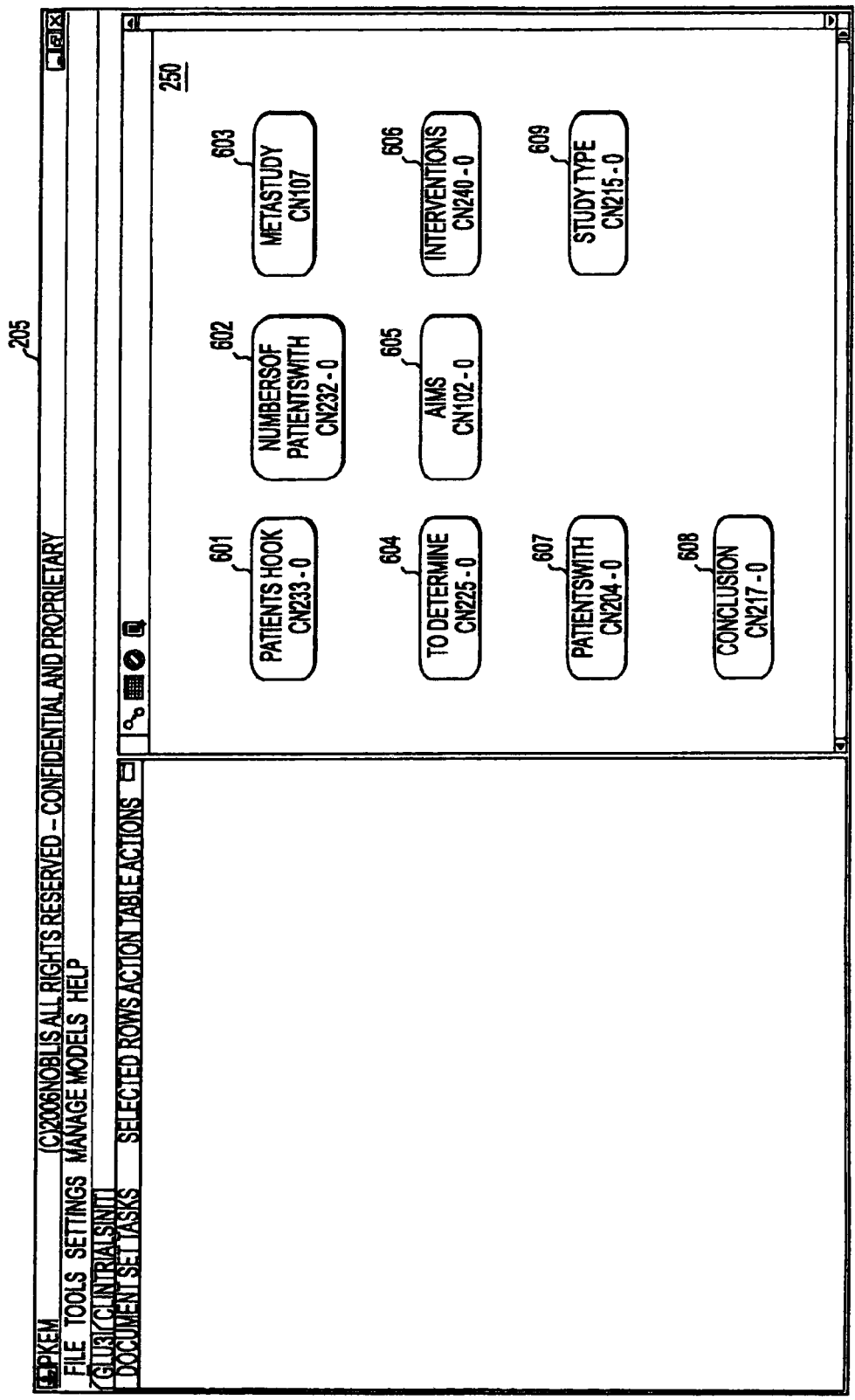

As described above with respect to FIG. 3, a user may begin to build model 250 with existing resources. If the user has received a model, for example from a colleague, the user may begin building model 250 using resources (e.g., concepts and extractors) from the received model. Returning to FIG. 4, the user may select option New Project 402, and sub-option New Corpus with Imported Model 411. FIG. 6 illustrates an exemplary user interface display consistent with an embodiment of the present invention to import concepts into models. As shown in FIG. 6, PIEM tool 205 may use existing resources to display model 250 that includes nodes representing concepts of interest. These concepts may include, for example, a textual or graphical representation of information relevant to a user. In one embodiment, model 250 may include one or more default concepts based on the results of raw text analysis. Alternatively or additionally, the user may build concepts. For example, the user may input the text to create a node representing a concept, such as concepts "patients hook" 601, "numberofPatientsWith" 602, "metastudy" 603, "to determine" 604, "aims" 605, "interventions" 606, "patientswith" 607, "conclusion" 608, and "study type" 609.

As an example, in a clinical trial abstract, one of the most important kinds of information is a statement about the participants of the study. Researchers may communicate these characteristics in a formulaic way. For example, often researchers start a sentence with trigger phrases such as, "Patients with", "Children admitted to hospital for", and "Women suffering from". Over time, users may accumulate a large set of these trigger phrases. Users may create another concept defined to include all sentences that contain trigger phrases related to participants of the study. With high reliability, a sentence with such a phrase may represent a highly enriched context in which to find information about clinical trial participants.

As another example, the statement of the "aims" of the clinical trial may be defined in a concept. Such "aims" statements may have trigger phrases that start a sentence, such as, "The purpose of the study was", "we aimed to determine", "we sought to assess", etc. Model 250, as shown in FIG. 6, has a node "aims" 605 representing a concept "aims", which may include a list of trigger phrases related to the aims of a clinical trial. A user may define another concept (e.g., "treatment results") based on the concept "aims" such that in a clinical trial abstract, in more than 95% of the cases where a trigger phrase is found, the remainder of the sentence contains information about the goals of that clinical trial. Using this definitional dependency, a model may be automatically updated whenever the concept aims is modified. For example, if a user adds another trigger phrase to the concept "aims", extraction information related to the concept "treatment results" may be automatically updated. Alternatively or additionally, the user may be notified whenever a concept is updated or modified, and may be given the option to update the model, concept, extraction information, or other information based on a definitional dependency. Further, if a document is added to document set 210, the model may update extraction information based only on the additional document, without the need to re-extract information for the entire document set. One skilled in the art will recognize that using triggers to locate specific, information-rich contexts is not restricted to medical documents, as many different kinds of texts may contain information that is introduced or associated with some kind of trigger phrase.

Figure 7:
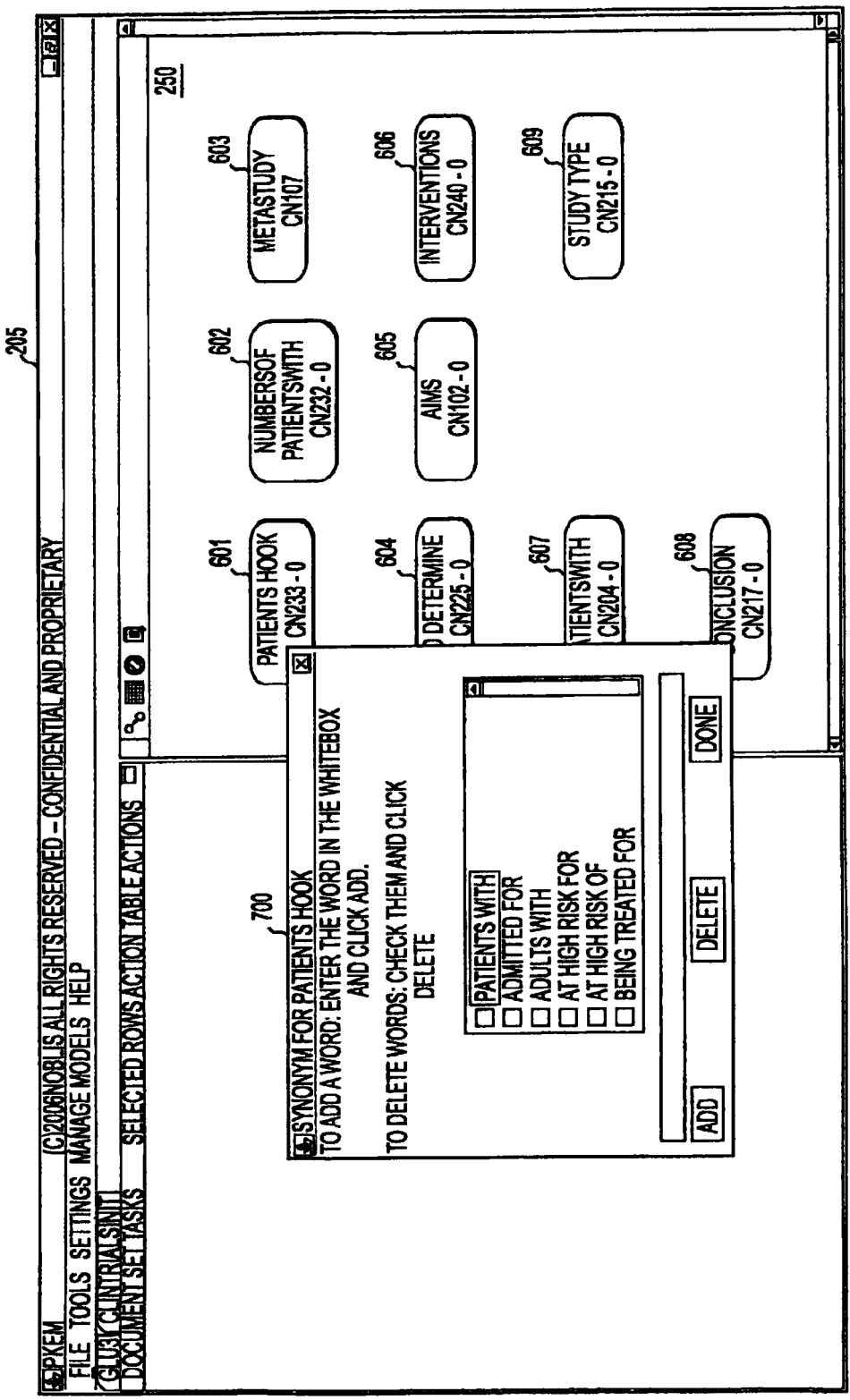

FIG. 7 is an exemplary user interface display consistent with an embodiment of the present invention that may define synonyms for concepts. As shown in FIG. 7, a user may create synonyms for the concepts in model 250 using synonym window 700. To add synonyms to a concept, the user may select, e.g., right click, on the desired node in model 205, for example node "patients hook" 601, and tool 205 may display Synonym Window 700. The user may add or delete words associated with each concept in model 250, as described in more detail in the '847 application.

Step 370: Apply Concepts to Document Set

Figure 8:
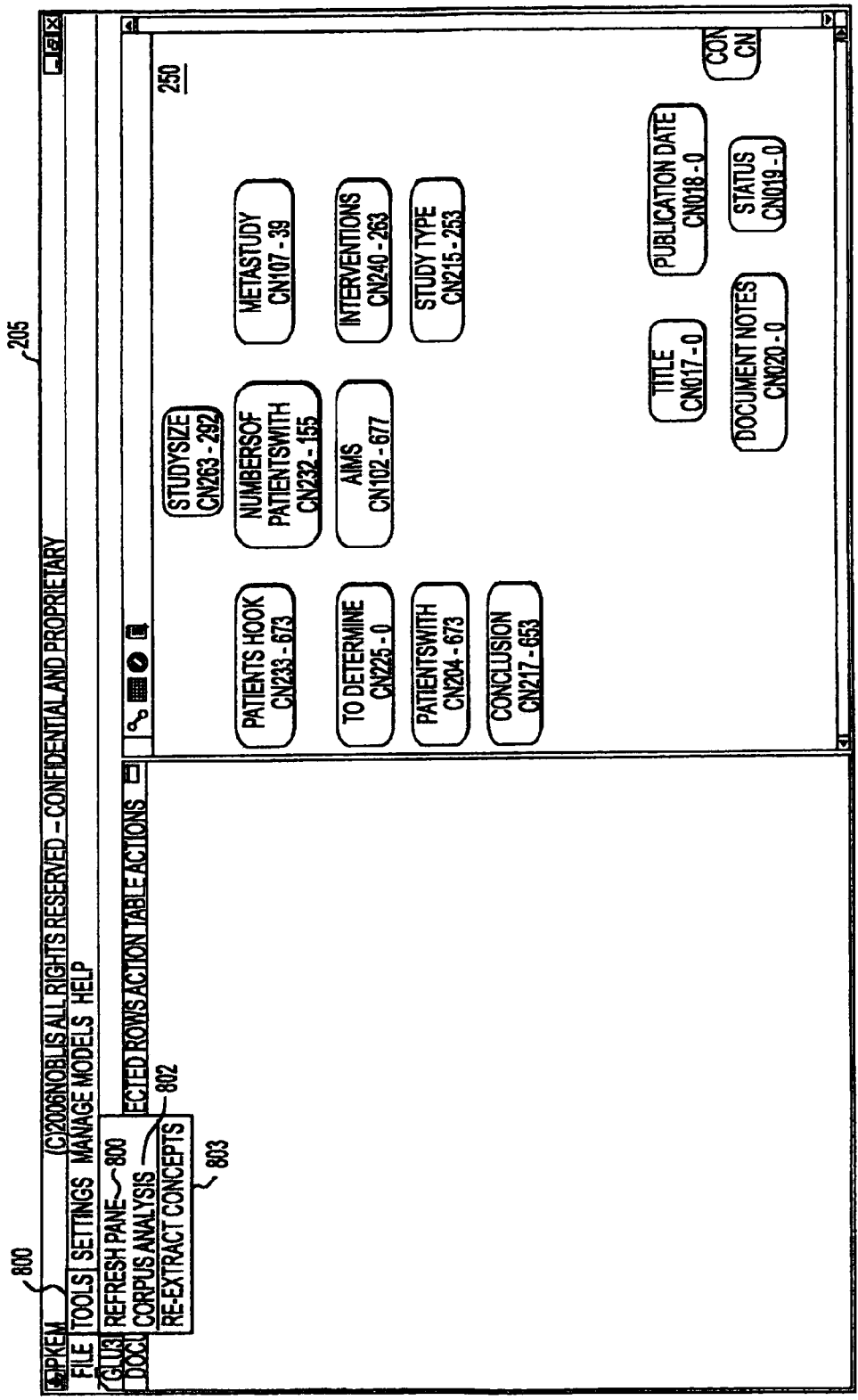

Each concept in model 250 may have an extractor assigned to it. Accordingly, if a user imports a concept, the user may also import its associated extractor. FIG. 8 is an exemplary user interface display consistent with an embodiment of the present invention that may extract information for concepts. As shown in FIG. 8, a user may navigate to menu 800, which contains options "Refresh Pane" 801, "Corpus Analysis" 802, and "Re-extract Concepts" 803, and may choose option "Re-extract Concepts" 803. PIEM tool 205 may then extract information from document set 210 using the concepts in model 250, or may present extraction options, as described in more detail below with respect to FIG. 9.

Figure 9:
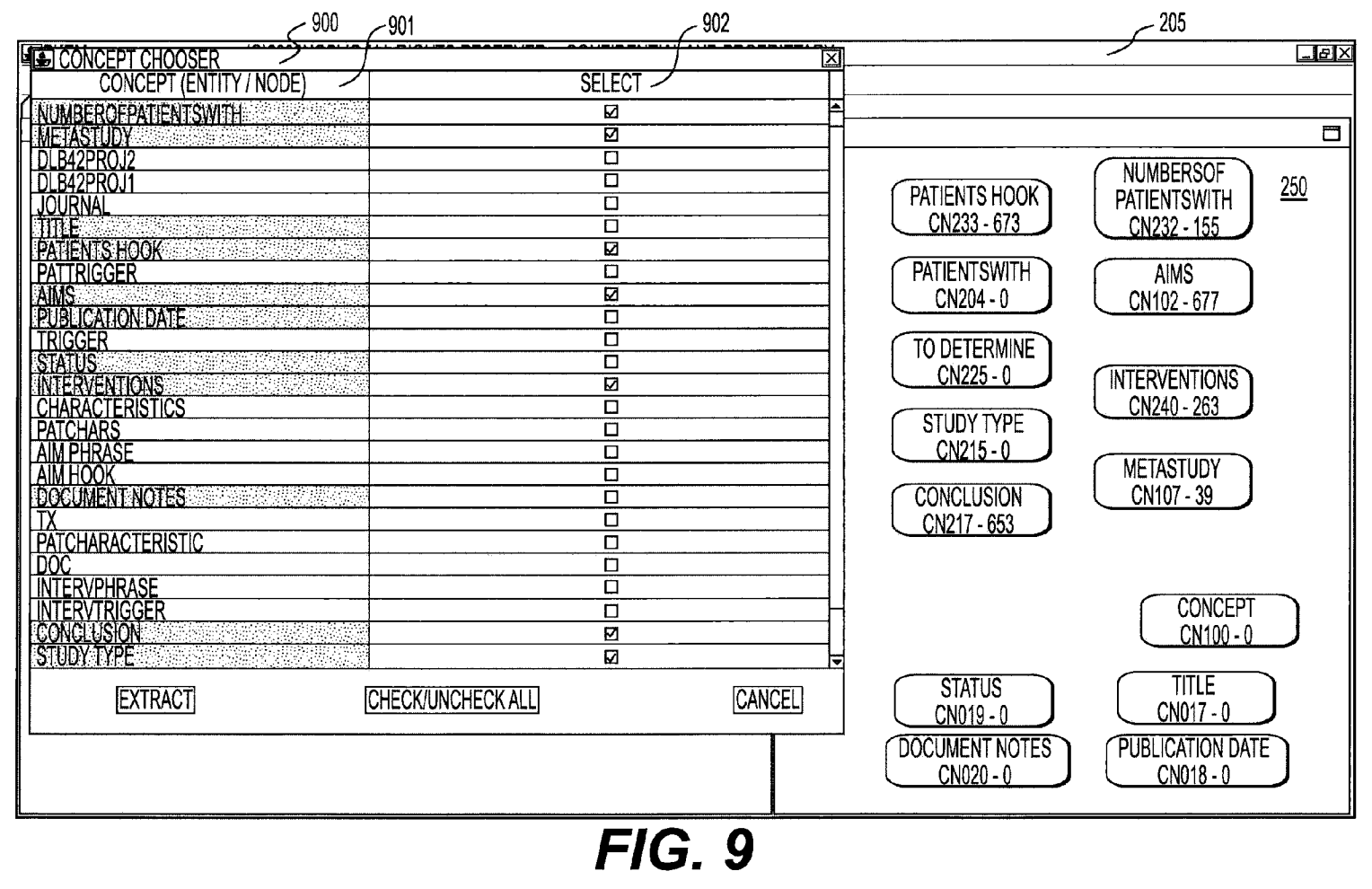

FIG. 9 is an exemplary user interface display consistent with an embodiment of the present invention that may present extraction options. As shown in FIG. 9, after a user selects "Re-extract Concepts" 803, PIEM tool 205 may display Concept Chooser 900, and the user may then select various concepts for extraction. Concepts may be listed in "Concept (Entity/Node)" column 901, and a checkbox or other selection means may be listed in "Select" column 902. The user may select various concepts for extraction, or, in an one embodiment, PIEM tool 205 may automatically select concepts for extraction. A skilled artisan will appreciate that many other means and methods may be used to display concepts and methods of selection for purposes of extraction.

Step 380: Review Results

After selecting a concept for extraction, each node representing a concept in model 250 may display the number of documents that contain one or more occurrences of that concept. FIG. 10 illustrates an exemplary user interface display consistent with an embodiment of the present invention that displays the number of documents that contain each concept. For example, as shown in FIG. 10, node "patients hook" 601 displays the number of documents 1010 (i.e., 673 documents) that contain one or more occurrences of concept "patient hook" 601.

Figure 11:
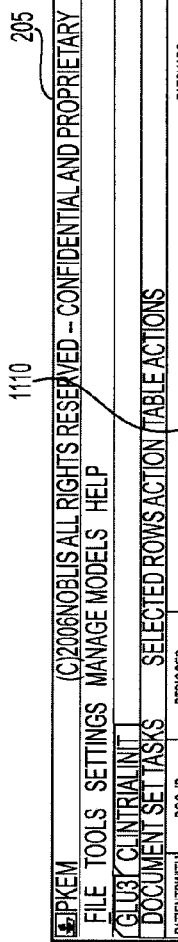

A user may also review other extraction results for a concept, for example by selecting, e.g., clicking, on the node representing the concept. FIG. 11 illustrates an exemplary user interface display consistent with an embodiment of the present invention that displays extraction results. A user may clicked on node "patients with" 607, for example, and PIEM tool 205 may display a results table 1110 with extracted information. As shown in FIG. 11, results table 1110 may contain a document identification (e.g., a number), a trigger phrase or synonym, and an excerpt of a document containing the trigger phrase or synonym. As one skilled in the art will recognize, in this example the extraction process does not require reliance on the specific topic of the clinical trial abstracts, but instead may use commonly accepted patterns of speech in the selected category of documents. Once a specific context is identified, the user may drill down into more specific aspects of the clinical trials.

Steps 350-360: Define and Add Concepts

Figure 12:
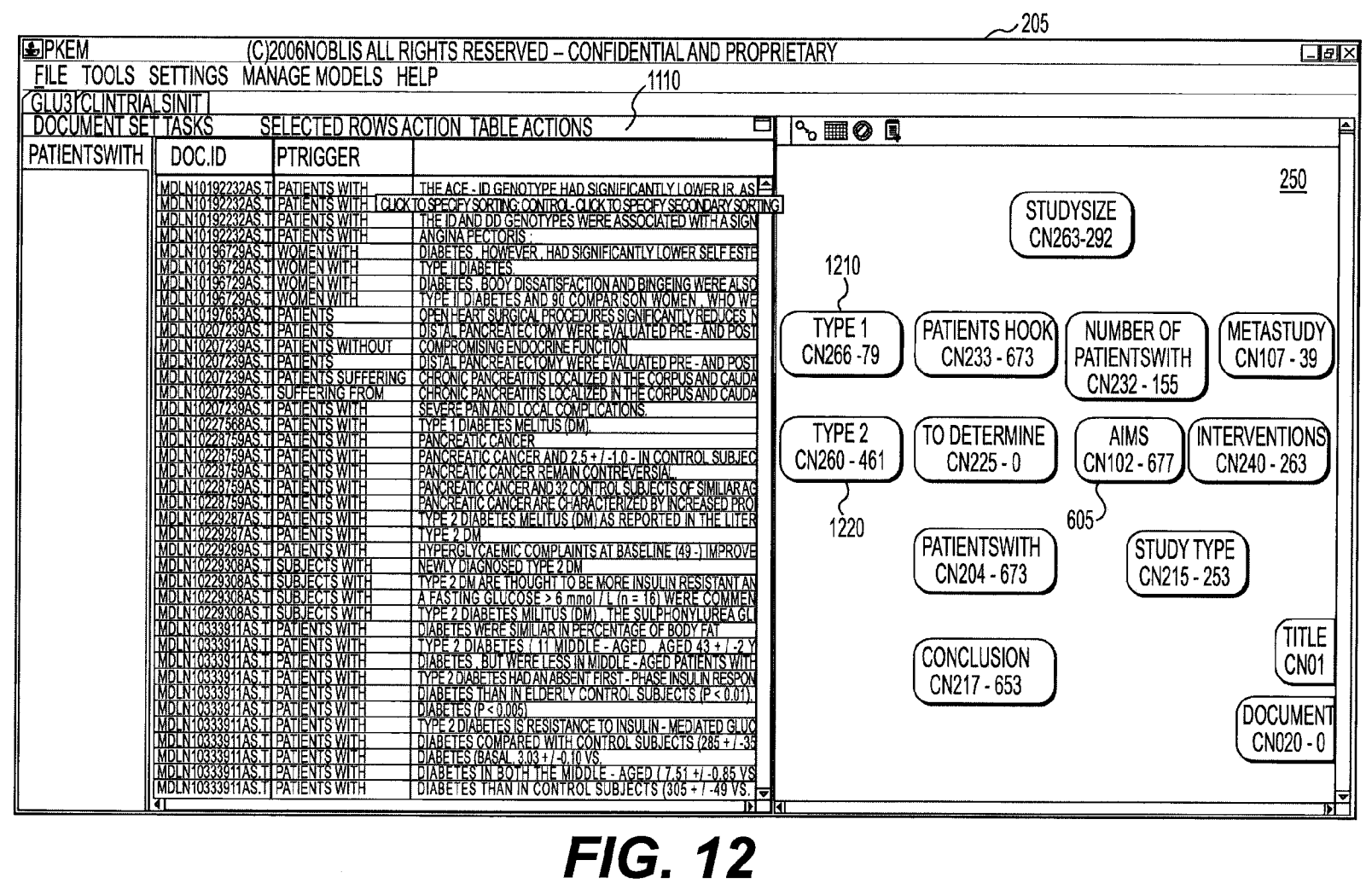

As an alternative, if a user does not have a model to work from, or if the user wishes to add concepts to an existing model, the user may start to define concepts that are meaningful for a specific document set. A user may define concepts and add the concepts to the model, for example as described in the '847 application. FIG. 12 illustrates an exemplary user interface display consistent with an embodiment of the present invention to add and define concepts. As an example, a user may define concepts by adding nodes "Type 1" 1210 and "Type 2" 1220, and may define synonyms for those concepts, for example to include roman numerals I and II, respectively. The user may then extract those concepts and view the results in results table 1110 and model 250. As shown in FIG. 12, the number of documents containing each concept is displayed in each node representing that concept (i.e., node "Type 1" 1210 displays 79 documents, and node "Type 2" 1220 displays 461 documents).

Figure 13:
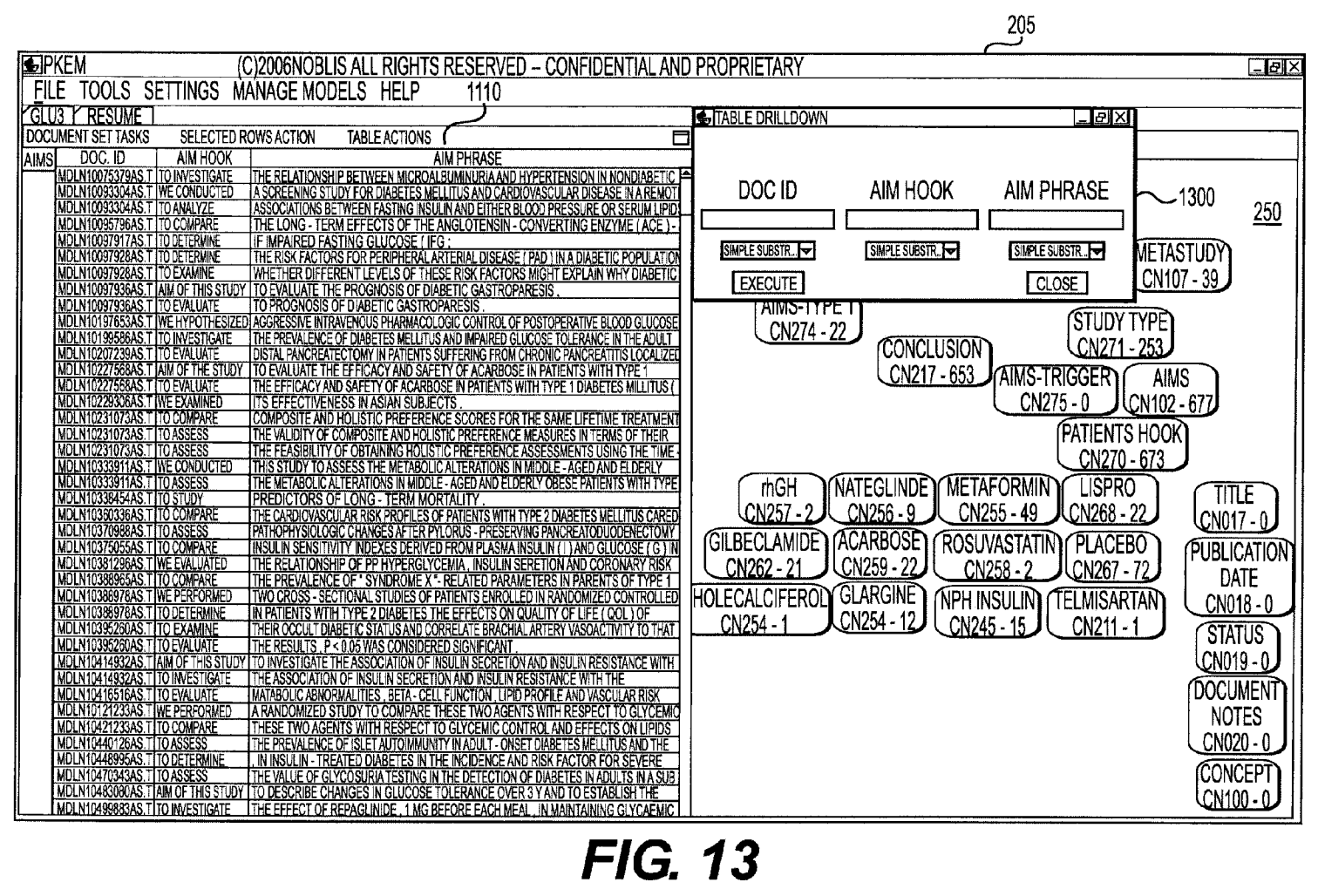

After defining and adding concepts to model 250, PIEM tool 205 may display extraction results for the additional concepts. FIG. 13 illustrates an exemplary user interface display consistent with an embodiment of the present invention that displays extraction results. The user may select, e.g., click on node 605 "aims" and select a "Table Drilldown" option to display "Table Drilldown" window 1300. The user may use "Table Drilldown" window 1300 to search extraction results in results table 1110. Results table 1110 may contain any number of results, such as document identifications (e.g., numbers), trigger phrases, synonyms, concepts, document excerpts, etc.

Step 390: Concept Management

Figure 14:
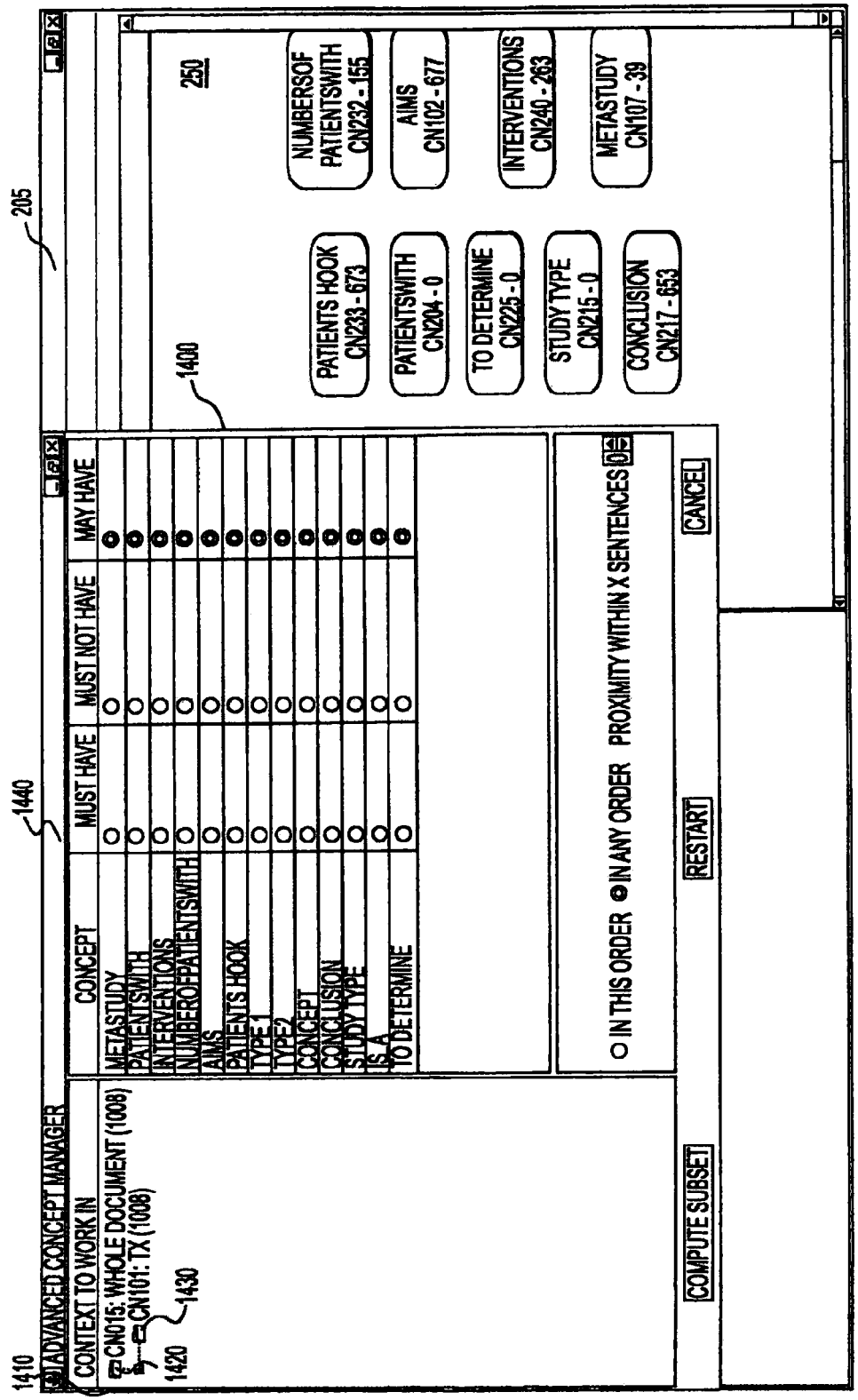

A user may refine and manage the concepts in a model by any number of ways. FIG. 14 illustrates an exemplary user interface display consistent with an embodiment of the present invention that allows for concept management. If the model already has concepts that the user wants to use in a "drilldown" mode, the user may open an Advanced Concept Manager window 1400. Hierarchy panel 1410 displays a containment hierarchy that gives the user an overview of which concepts are contained within other concepts. The top level of the containment hierarchy is a general context 1420, which represents the most general context in which to extract or to view the results of extraction for document set 210. In the embodiment show in FIG. 14, the most general context to view results is the entire document in document set 210. One skilled in the art will recognize that the most general context in which to view results may depend on the type of information in document set 210. The next level "tx" 1430 may include a single block of text. After the "whole document" general context 1420 and "tx" context 1430, panel 1410 may display contexts that result from the extraction of concepts. Panel 1440 displays a list from which the user may select one or more concepts and combinations thereof for additional searching. As shown in panel 1440, the user may search for concepts in a specified proximity to each other, as well as the order of concepts within document set 210.

Figure 15:
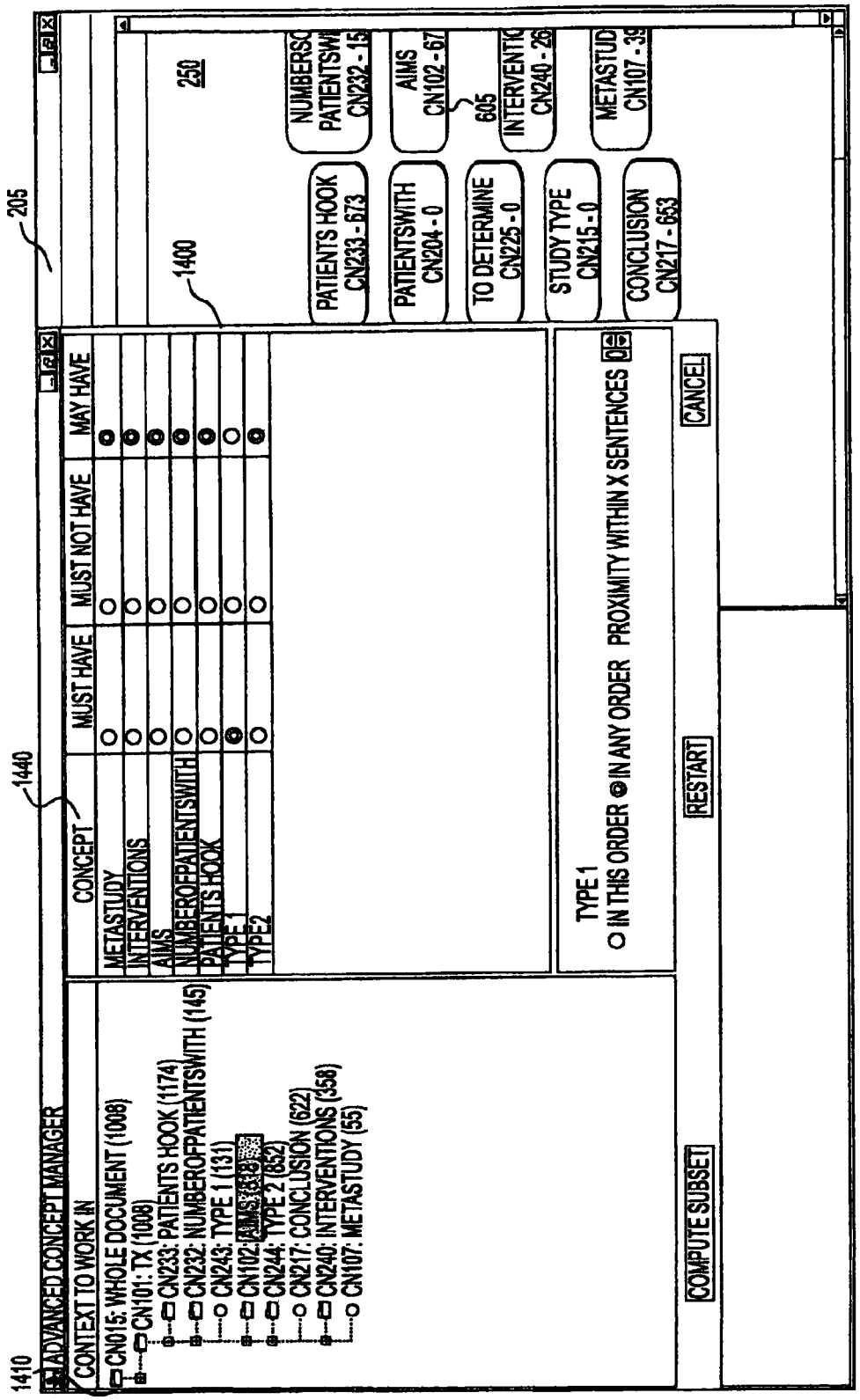
Figure 16:
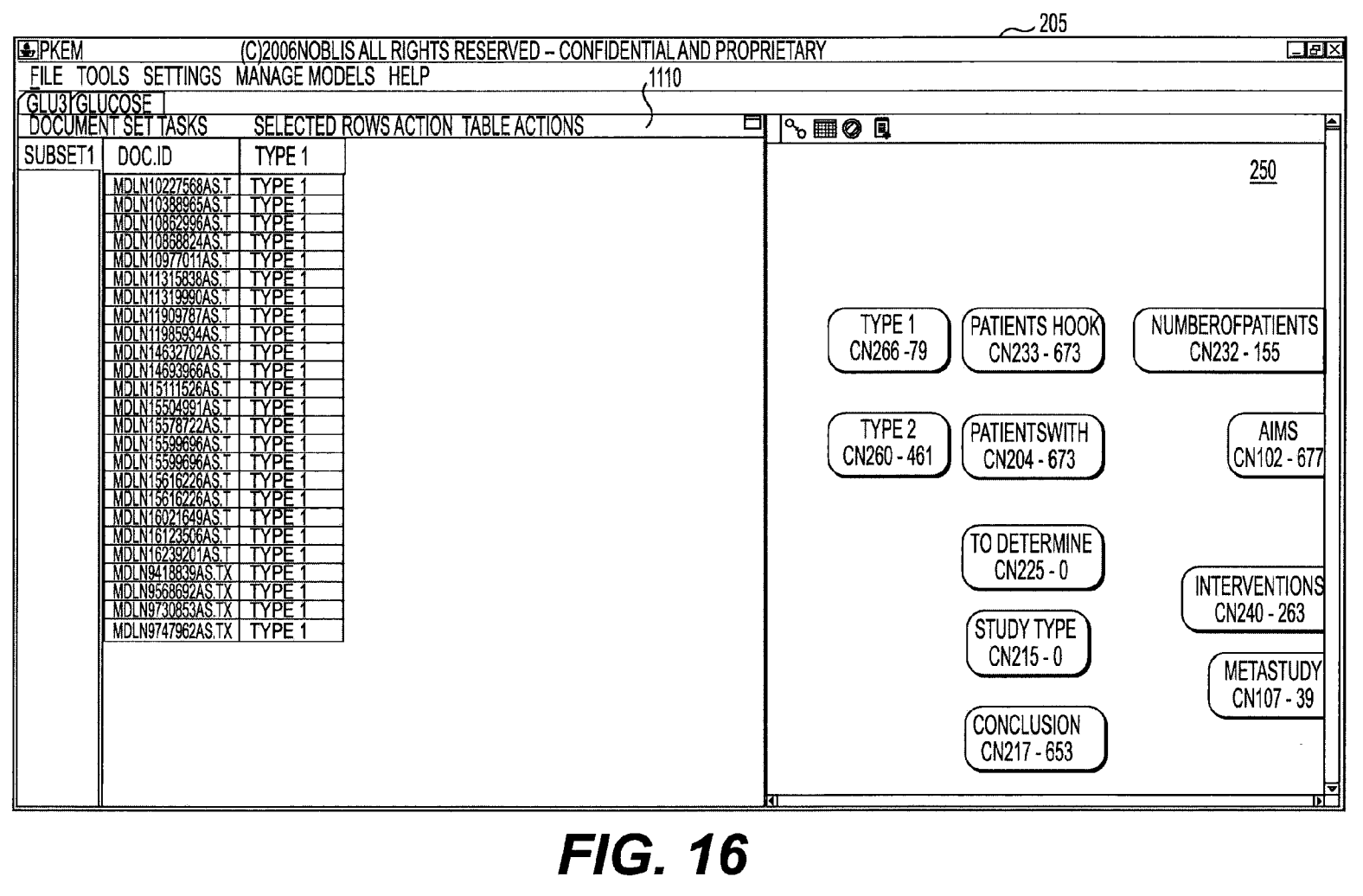

FIG. 15 illustrates another exemplary user interface display consistent with an embodiment of the present invention that allows for concept management. In this example, the user selects node 605 "Aims", and in concept selection panel 1440, selects only the concept "Type 1". PIEM tool 205 calculates the subset of all instances of "Type 1" that appear within the "aims" context. FIG. 16 illustrates an exemplary user interface display consistent with an embodiment of the present invention that displays results of concept management. As shown in FIG. 16, results table 1110 displays a table of all instances of "Type 1" that appear within the "aims" context. For example, each row indicates a document identification and a concept (i.e., "type 1") found in that document.

Figure 17:
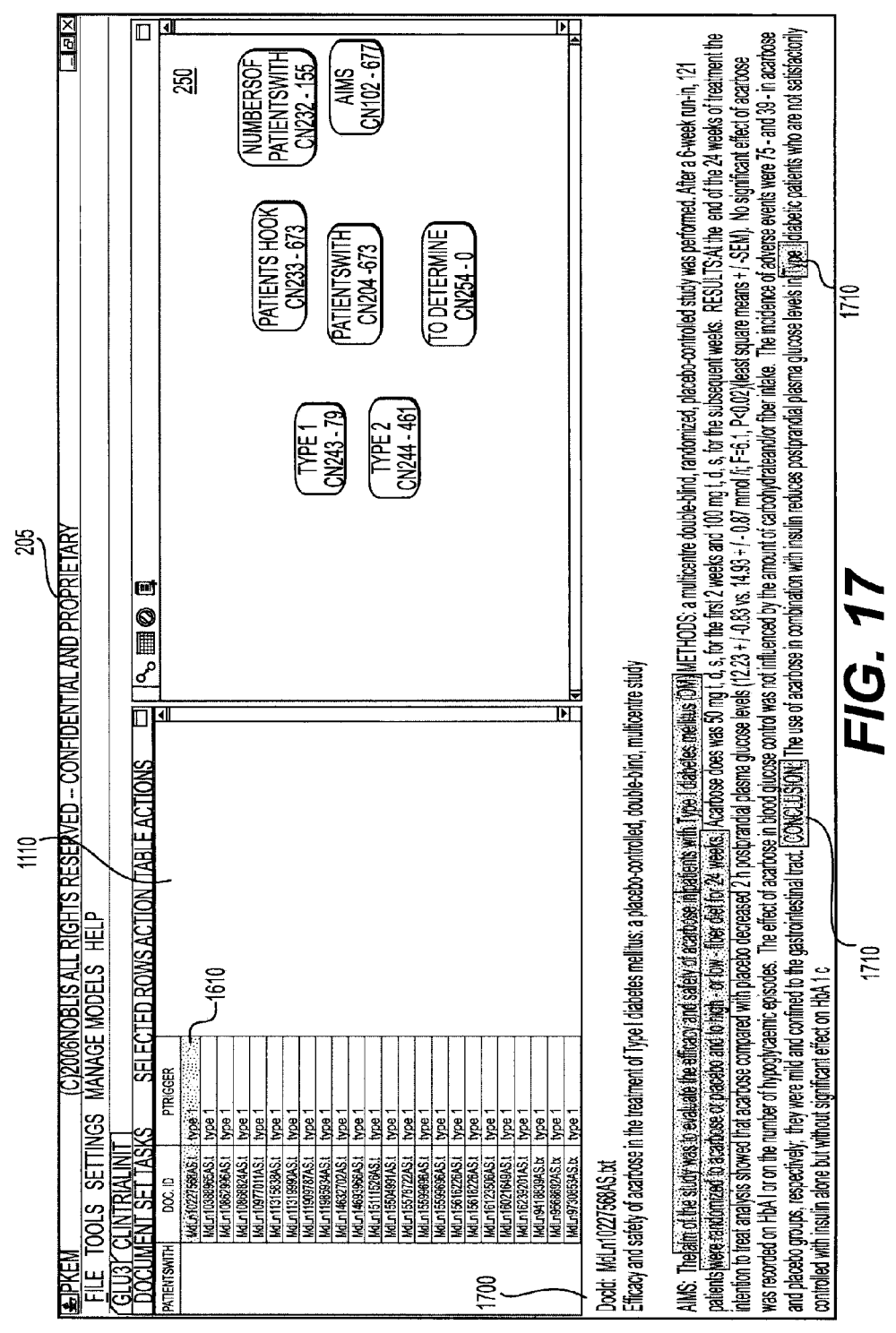

The user may click on a table row within results table 1110 to view a document or excerpt. FIG. 17 illustrates an exemplary user interface display consistent with an embodiment of the present invention that displays a document. As shown in FIG. 17, a user has selected table row 1610 from results window 1110. PIEM tool 205 displays document window 1700, which includes the selected document and highlighted segments 1710 of the "Aims" concept.

Figure 18:
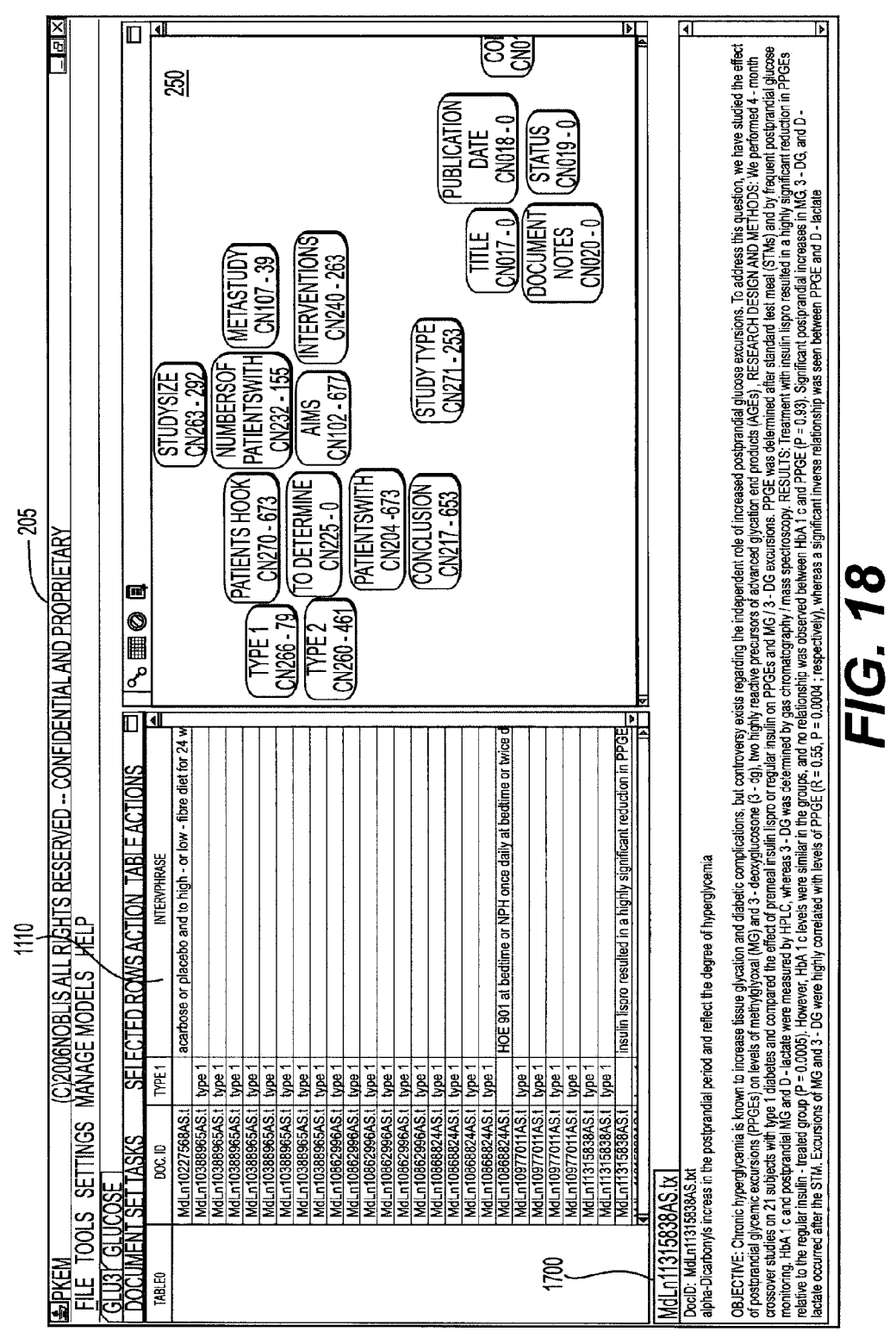

FIG. 18 illustrates an exemplary user interface display consistent with an embodiment of the present invention that displays results of concept management. As shown in FIG. 18, a user may manipulate results table 1110, for example by adding a column to results table 1110. As illustrated in this example, the user may add a column to results table 1110 to determine all instances of the concept "interventions" that are in the documents that contain the "Type 1" concept within the "aims" concept. One skilled in the art will recognize that the embodiment shown in FIG. 18 is just one example of a method to display results in PIEM tool 205, as many other methods of displaying results is possible.

Figure 19:
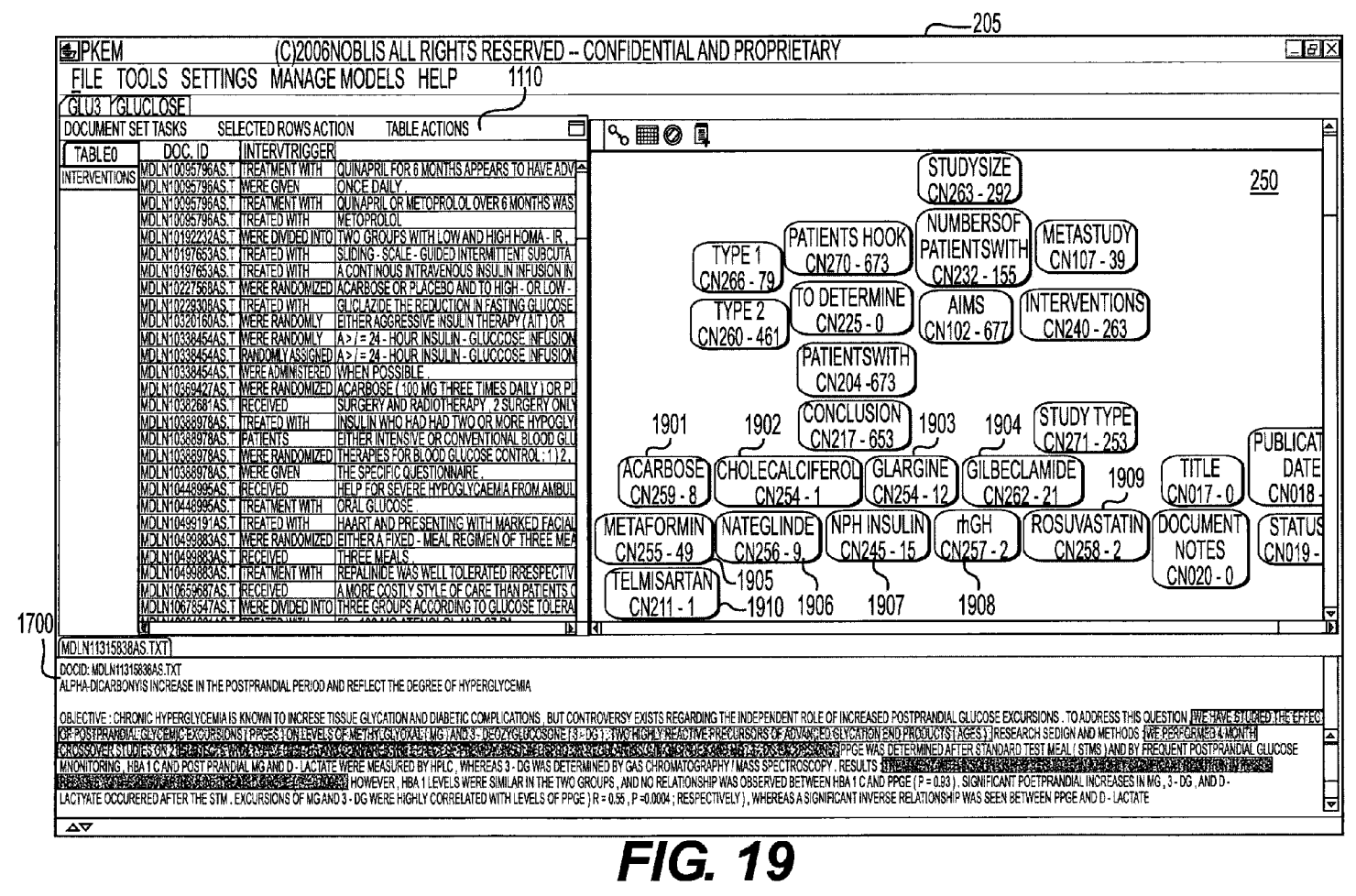

FIG. 19 illustrates an exemplary user interface display consistent with an embodiment of the present invention that displays additions of concepts to a model. As shown in FIG. 19, the user may add concepts to model 250 at any time. As shown in this example, the user may add nodes 1901-1910 that represent concepts related to treatments. In one embodiment, PIEM tool 205 may store the date and time for events such as initial document preprocessing, extraction of a specific concept, removal of a specific concept, modification of the definition of a specific concept, or addition of a concept to model 250. Because PIEM tool 205 may store an extractor for each concept, changes to one concept may trigger a cascade of modifications depending on dependencies between concept definitions, and the date or time at which each critical event was most recently executed. PIEM tool 205 may calculate any dependencies between concept definitions, and may automatically update both model 250 and extracted information (e.g., results table 1110 and document window 1700) based on the calculation.

Figure 20:
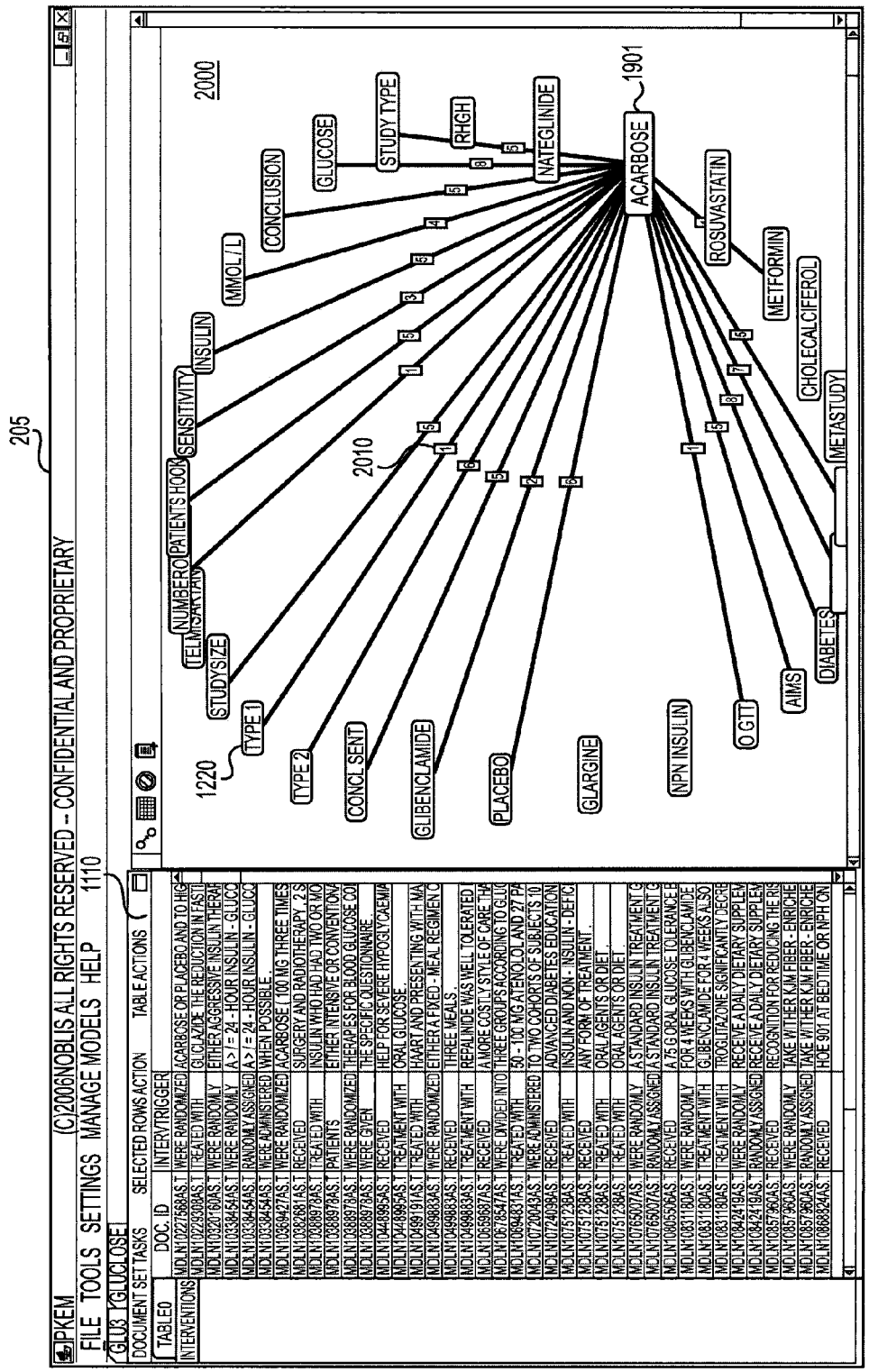
Figure 21:
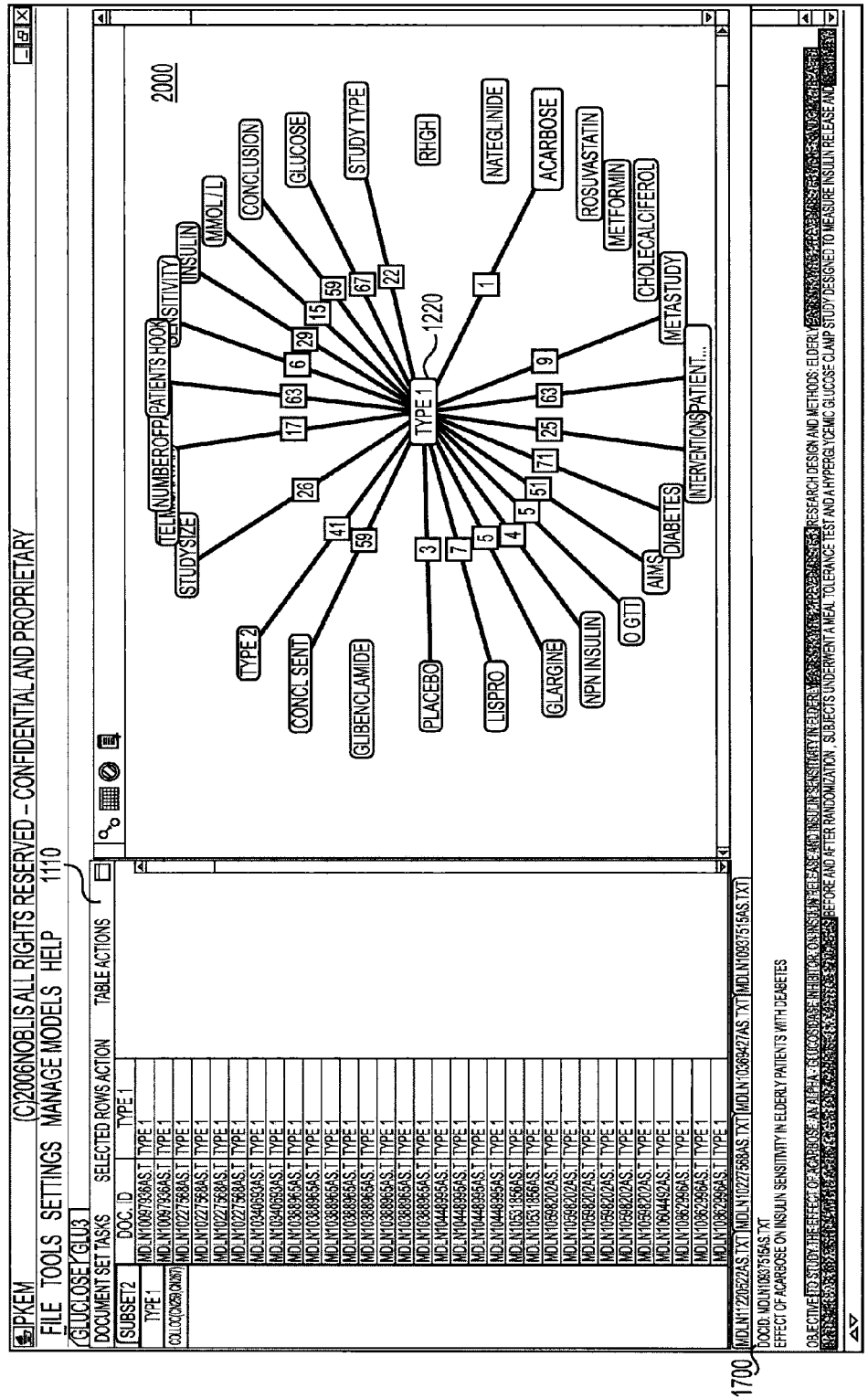

FIG. 20 illustrates an exemplary user interface display consistent with an embodiment of the present invention that displays relations between concepts. As shown in FIG. 20, a user may select, e.g., mouse over, a certain node representing a concept, such as node 1901 "abarcose", and model 250 may display any concepts that are collocated with the selected concept in collocation view 2000. In this example, each node is connected to every other node in model 250, along with a representation of the number of documents that contain both nodes. For example, as shown in FIG. 20, representation 2010 indicates that only one document includes both of the concepts represented by nodes "acarbose" 1901 and "Type 1" 1220. FIG. 21 illustrates an exemplary user interface display consistent with an embodiment of the present invention that displays relations between concepts. As shown in FIG. 21, a user may determine which treatments occurred with "Type 1" concept 1220 by selecting node 1220 and reviewing the results, for example in results table 1110.

Figure 22:
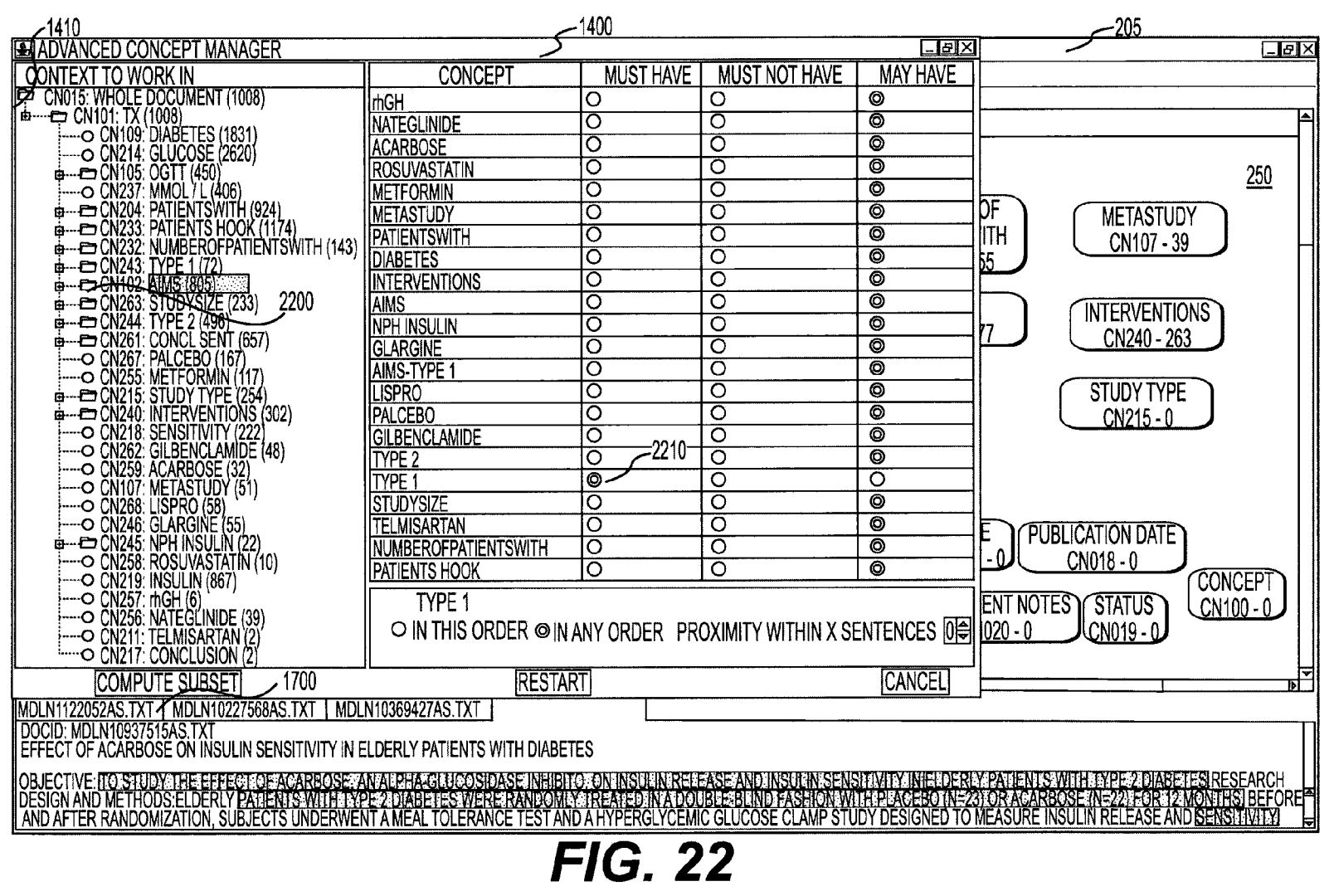

FIG. 22 illustrates an exemplary user interface display consistent with an embodiment of the present invention for advanced concept management. As shown in FIG. 22, a user may return to the Advanced Concept Manager 1400, select "aims" context 2200 in hierarchy panel 1410, and select the "type 1" concept using selection button 2210 to indicate that the user wants to search for the concept "type 1" within the results for the concept "aims."

Figure 23:
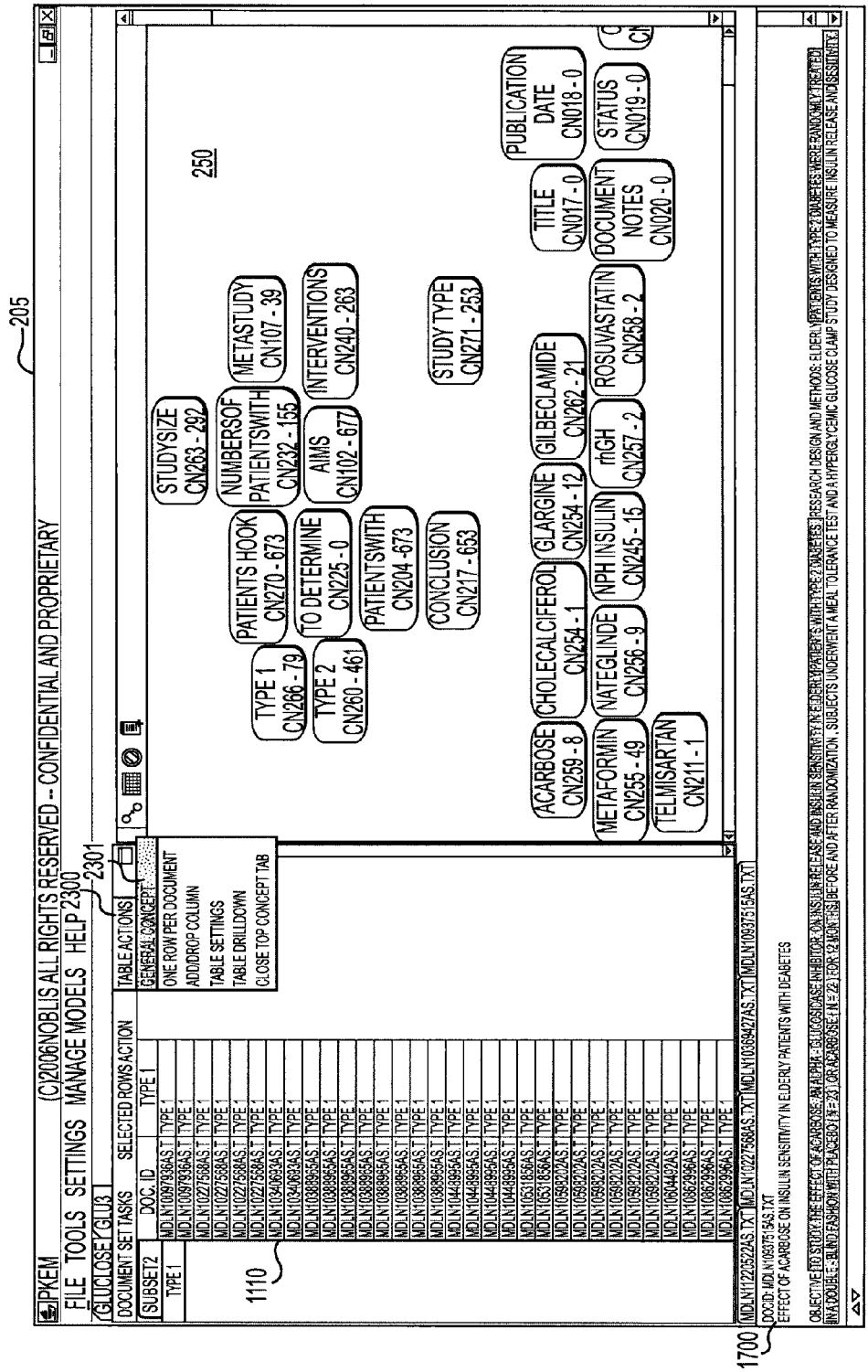
Figure 24:
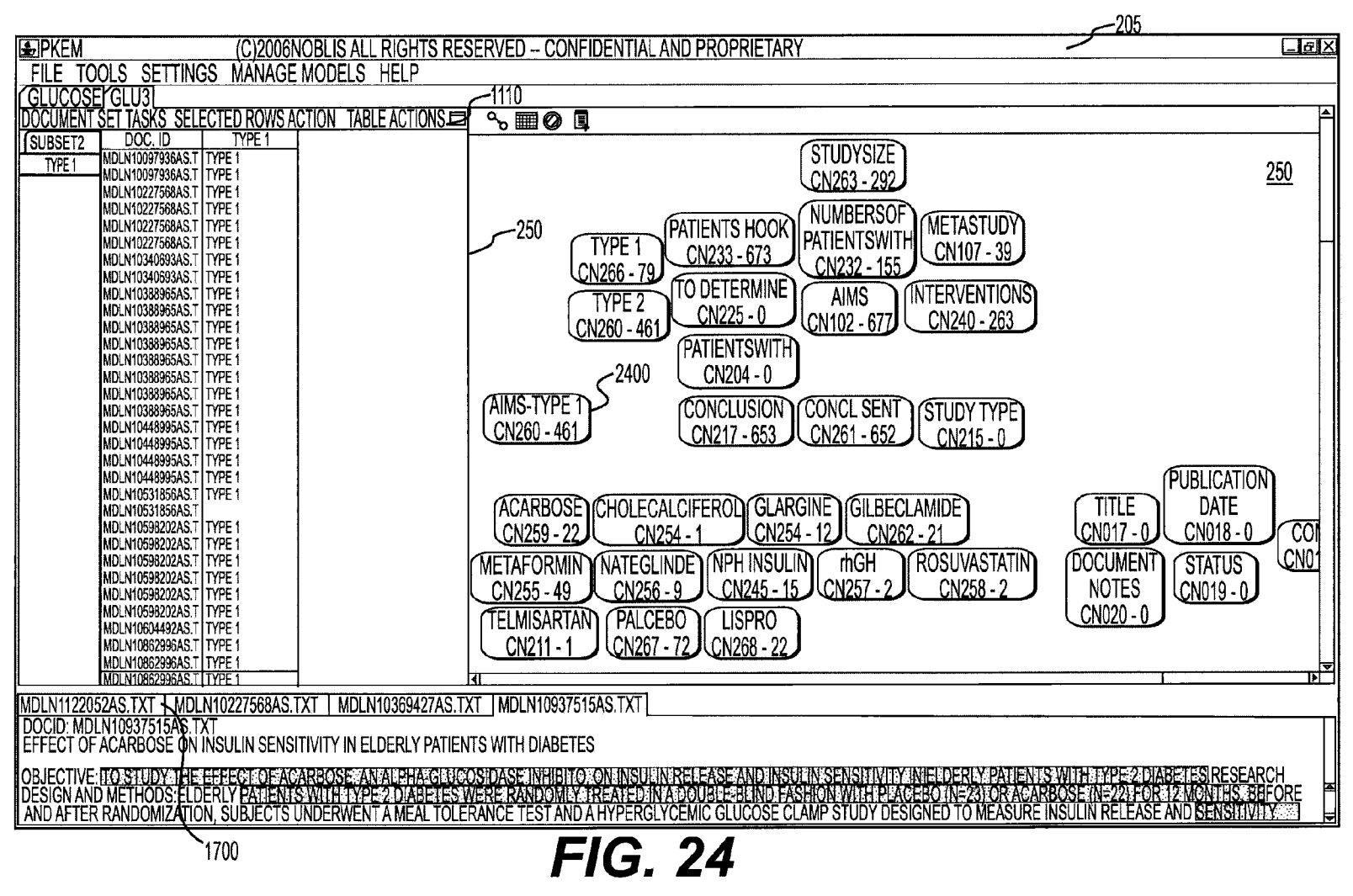

FIG. 23 illustrates an exemplary user interface display consistent with an embodiment of the present invention for advanced concept management. A user may select menu "Table Actions" 2300 and select option "Generate Concept" 2301 to generate a new concept containing the selections from Advanced Concept Manager 1400. PIEM tool 205 may request that the user enter a name for the new concept, and may then add a node representing the new concept to model 250. FIG. 24 illustrates an exemplary user interface display consistent with an embodiment of the present invention for advanced concept management. As shown in model 250 in FIG. 24, the user has created new node "Aims—type 1" 2400 representing the new concept created by the user. This simple, intuitive action is another way in which the user can create concepts in model 250. A table is an alternative way of viewing a concept. In this case, the user asked PIEM tool 205 to create a specific table, and then to add its corresponding concept to the model. In this way, every action a user performs can be captured and stored in PIEM tool 205's internal extraction language. If at any point the user determines that a table is important or useful enough to be treated as a concept in its own right, PIEM tool 205 may create the corresponding concept. Once this concept is added to model 250, it is fully available for use with any other concept. For example, if new documents were added to document set 210, the user could ask PIEM tool 205 to extract "Aims—type 1" in those new documents and PIEM tool 205 would know the entire process needed to extract that derived concept.

Figure 25:
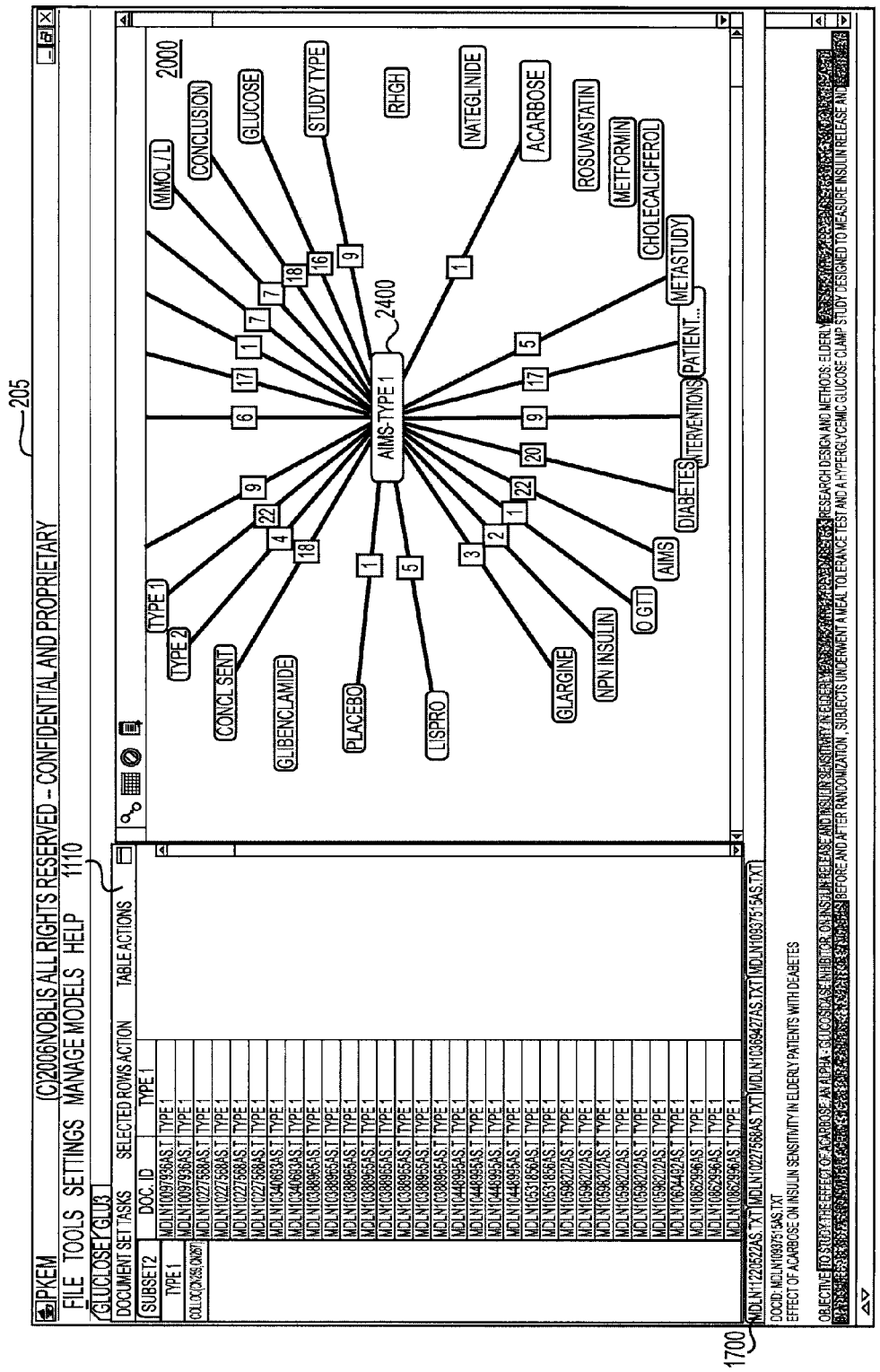

FIG. 25 illustrates an exemplary user interface display consistent with an embodiment of the present invention for advanced concept management. As shown in FIG. 25, the user may view the new node 2400 "Aims—type 1" in collocation view 2000 and review what treatments were discussed in clinical trial abstracts that also discuss type 1 patients with their aims.

Figure 26:
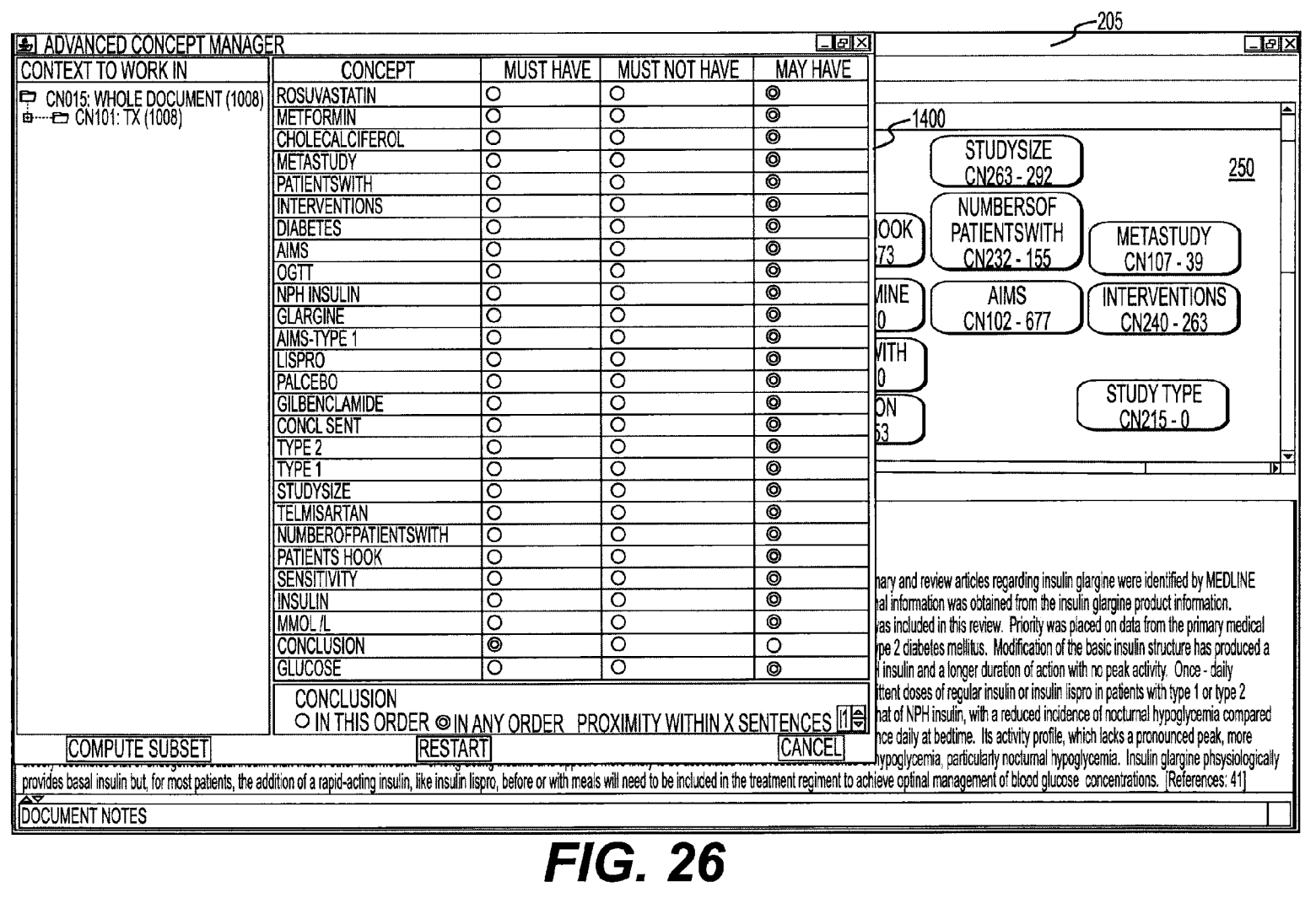
Figure 27:
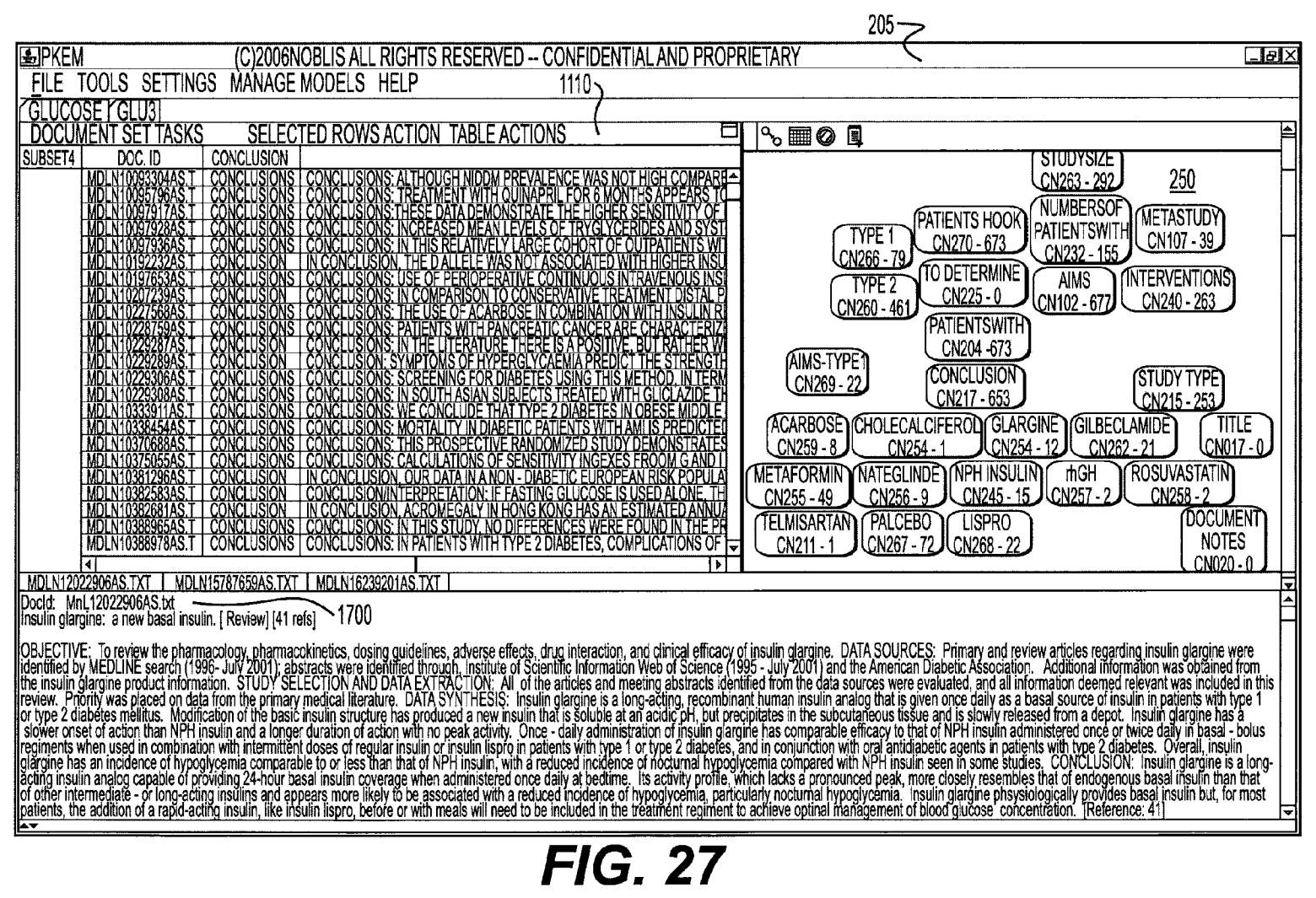

FIG. 26 illustrates an exemplary user interface display consistent with an embodiment of the present invention for advanced concept management. As shown in FIG. 26, a user may use Advanced Concept Manager window 1400 to locate any documents that contain only the singular and plural of the word "conclusion." From these results, the user may begin to build a trigger concept. After extracting the results for the concept "conclusion," the user may ask PIEM tool 205 to return all occurrences of concept "conclusion" together with the single sentence that contains it. FIG. 27 illustrates an exemplary user interface display consistent with an embodiment of the present invention for concept management. PIEM tool 205 displays the result of the user's search for "conclusion" in results window 1110. The user may again view any individual document from results table 1110 in document window 1700, for example by selecting a row from results table 1110.

Figure 28:
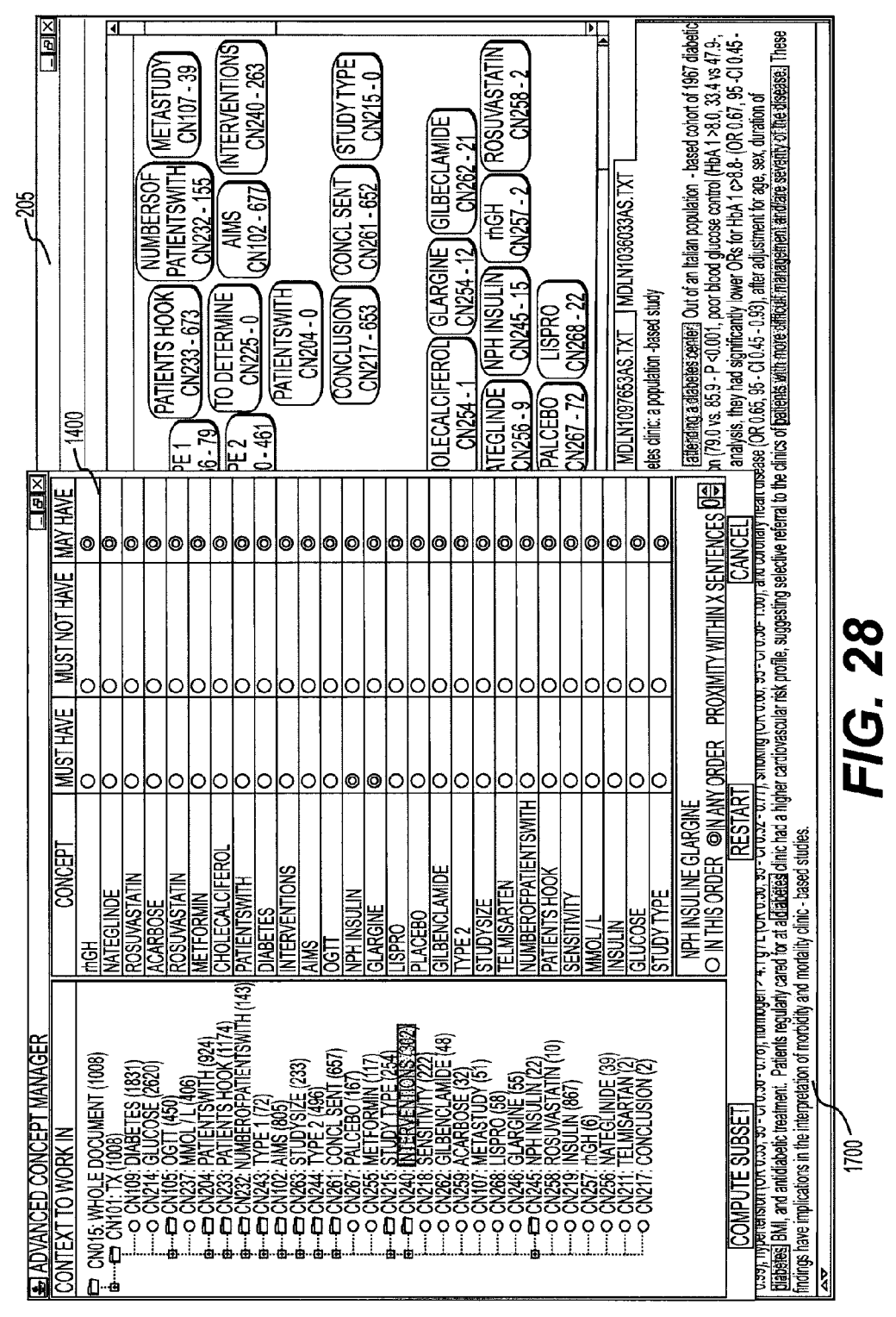
Figure 29:
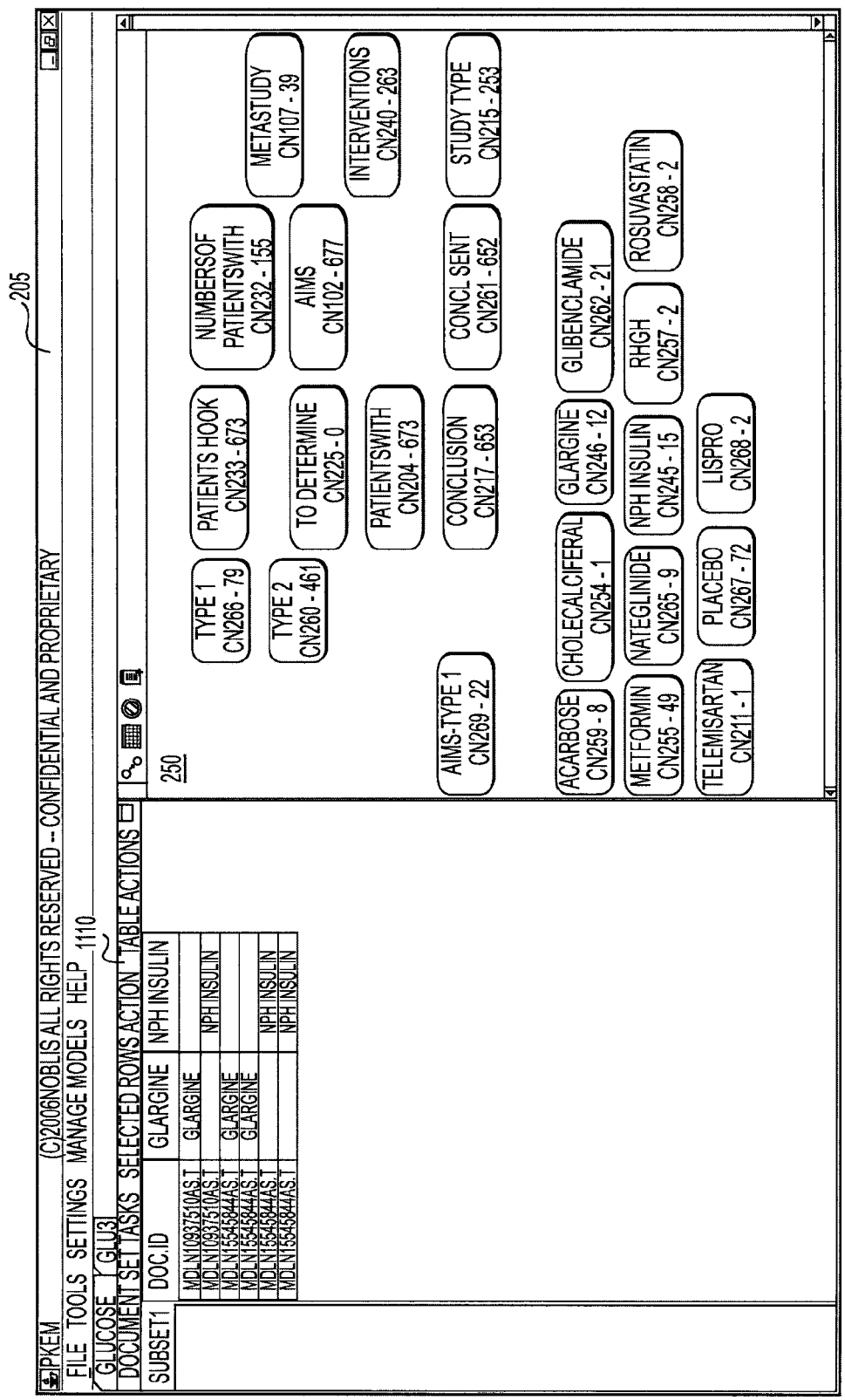

A user may also compute subsets of various concepts in model 250. FIG. 28 illustrates an exemplary user interface display consistent with an embodiment of the present invention for computing subsets of concepts. As shown in FIG. 28, after having looked at treatments, the user may use PIEM tool 205 to compute a subset of concepts, for example, to locate a specific result for all trials that compared insulin NPH and glargine, or more specifically, to find the conclusion statements within selected trials. To this end, as shown in FIG. 28, the user may open Advanced Concept Manager 1400 and select the context "interventions." Within "interventions", the user may check "nph insulin" and "glargine." FIG. 29 illustrates an exemplary user interface display consistent with an embodiment of the present invention for displaying results of computing subsets of concepts. As shown in FIG. 29, PIEM tool 205 responds to the user selections shown in FIG. 28 with results table 1110, which displays the identifiers for documents whose "intervention" context contained both "nph insulin" and "glargine." A user may continue to compute subsets, as shown in FIGS. 28-29, to determine any number of subsets or combinations of concepts in model 250.

Figure 30:
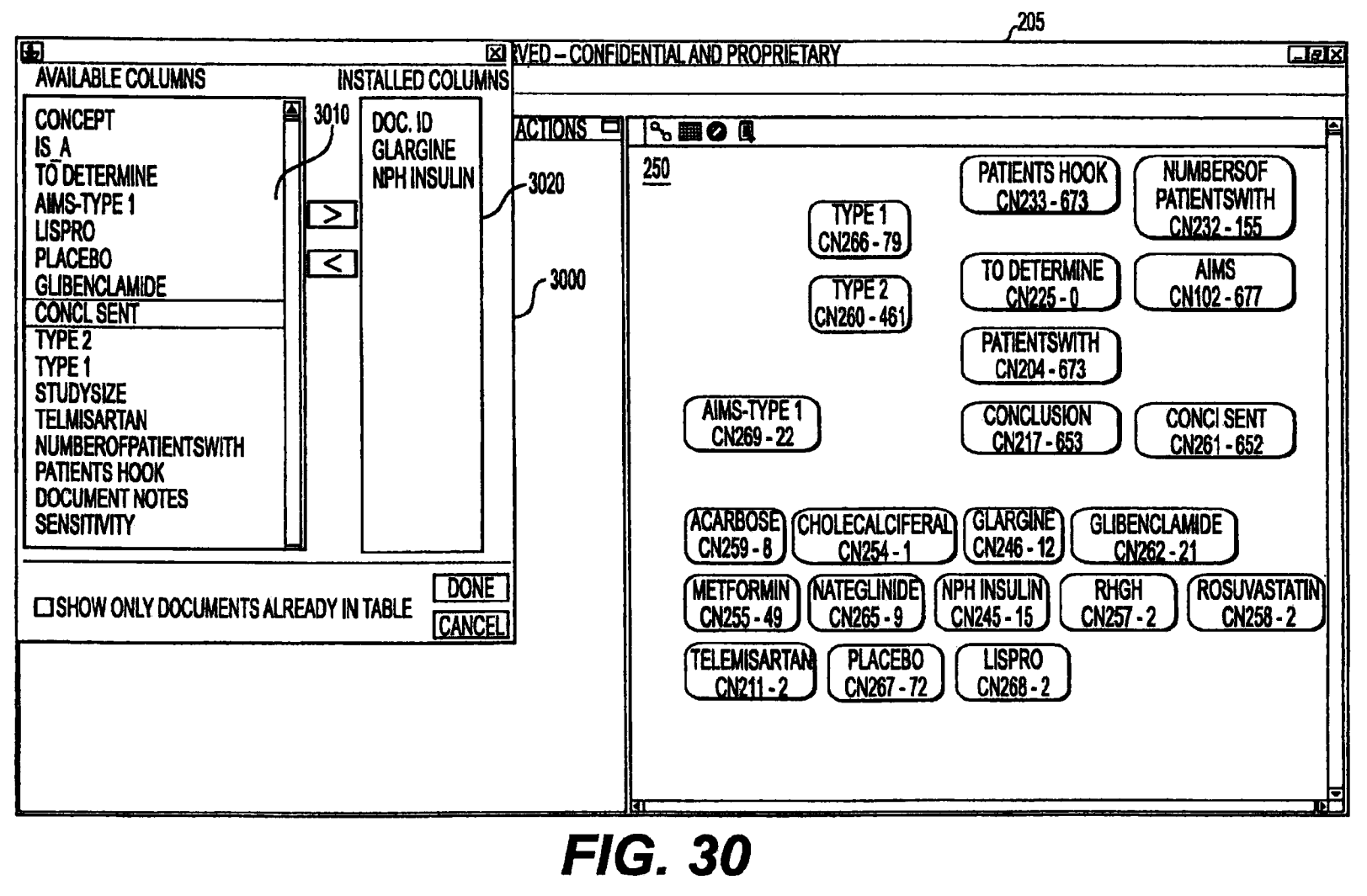
Figure 31:
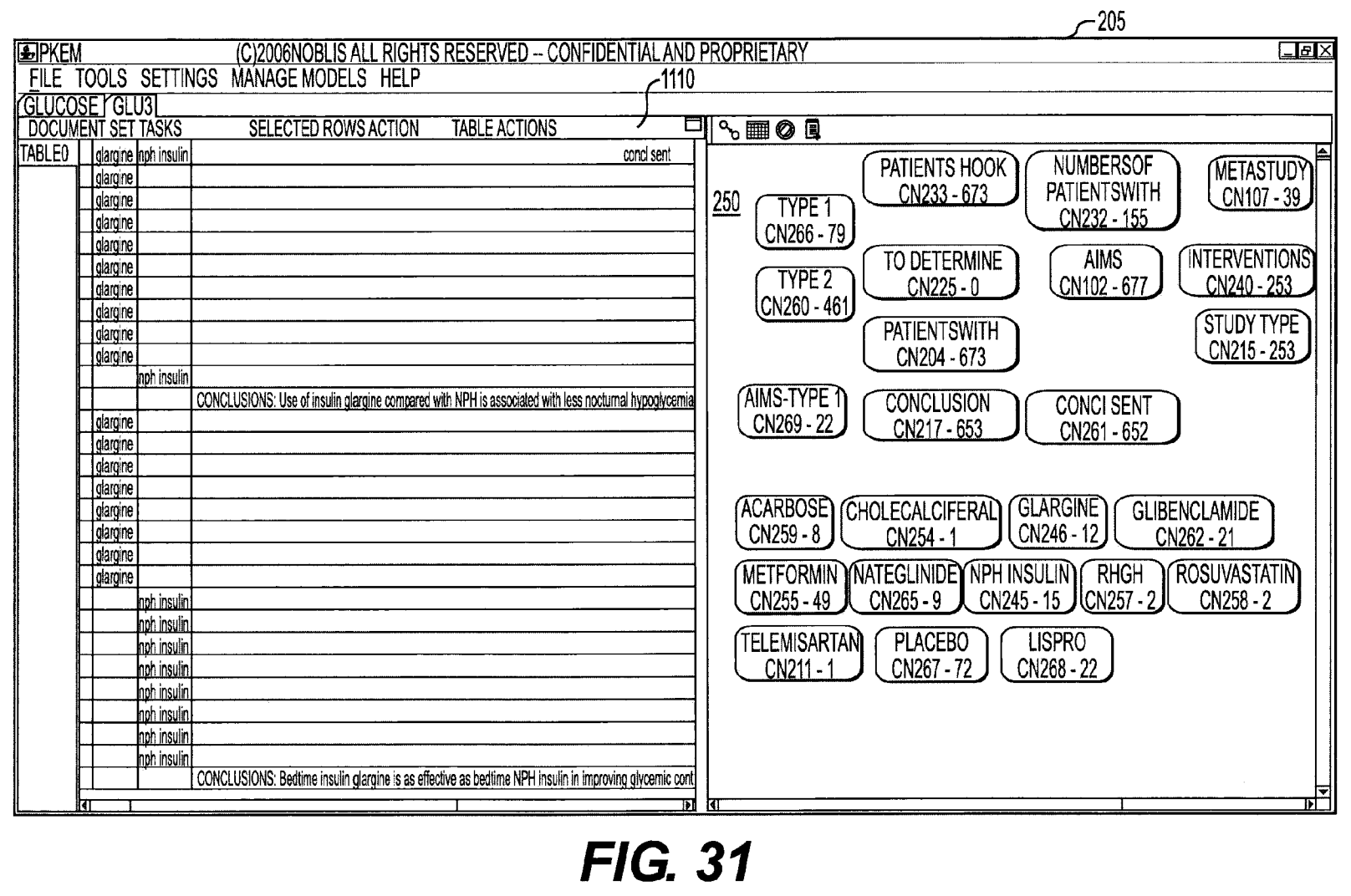

As described above with respect to FIG. 3, a table may represent a multi-context information resource. Users may manipulate tables within PIEM tool 205 for advanced concept management. FIG. 30 illustrates an exemplary user interface display consistent with an embodiment of the present invention for advanced concept management using tables. The user may add a column to results window 1110 (not shown) by utilizing column manager 3000, and selecting from the "Available Columns" 3010 to add to the "Installed Columns" 3020. In this way, a user may combine multiple existing concepts into one single new concept. FIG. 31 illustrates another exemplary user interface display consistent with an embodiment of the present invention for advanced concept management using tables. As shown in FIG. 31, the new column created in FIG. 30 appears in results table 1110. In one embodiment, a user may save results table 1110 as a new concept for model 250. In another embodiment, PIEM tool 205 may automatically generate a new concept for model 250 upon creation of the new column in results table 1110.

Figure 32:
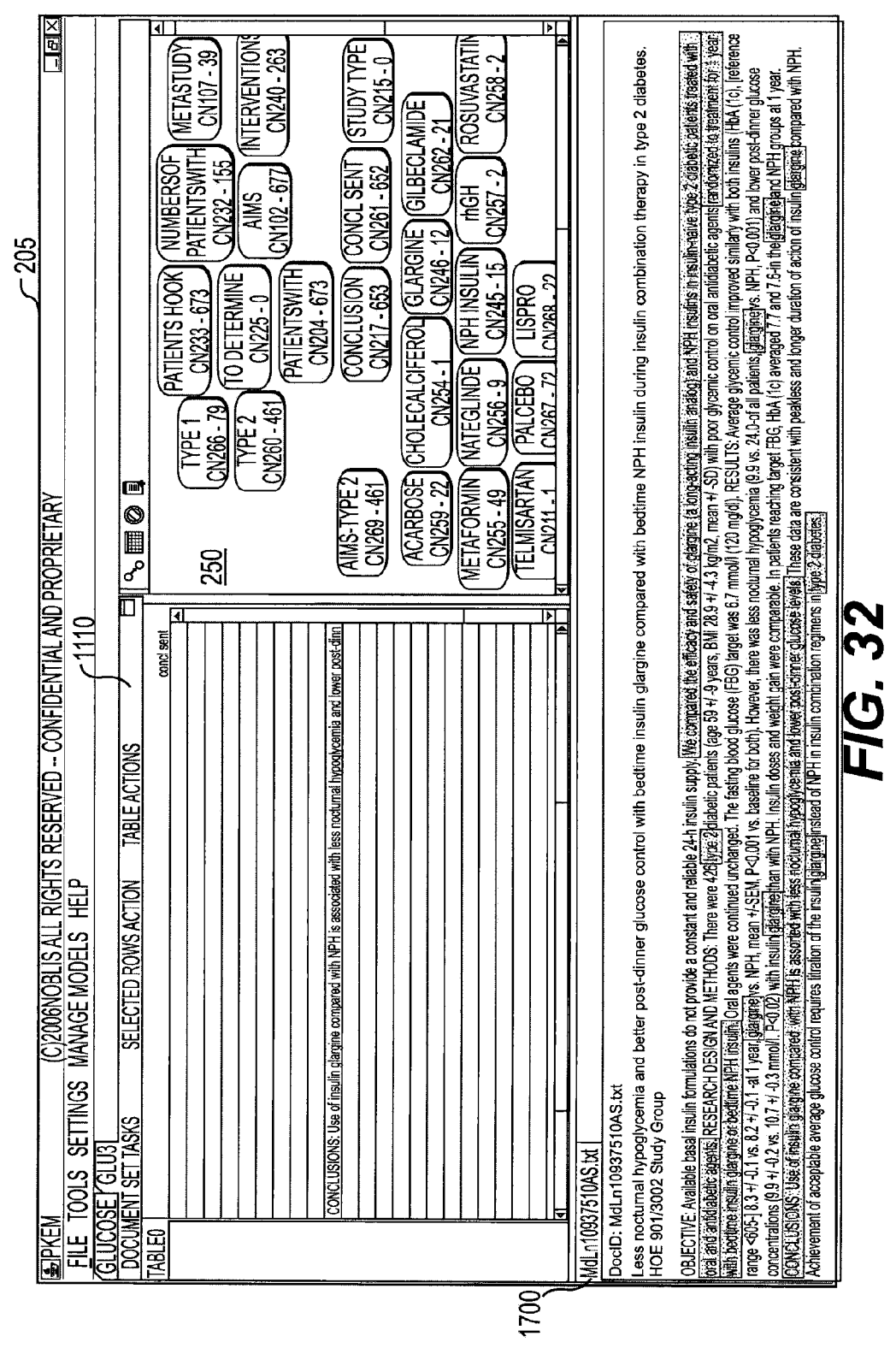
Figure 33:
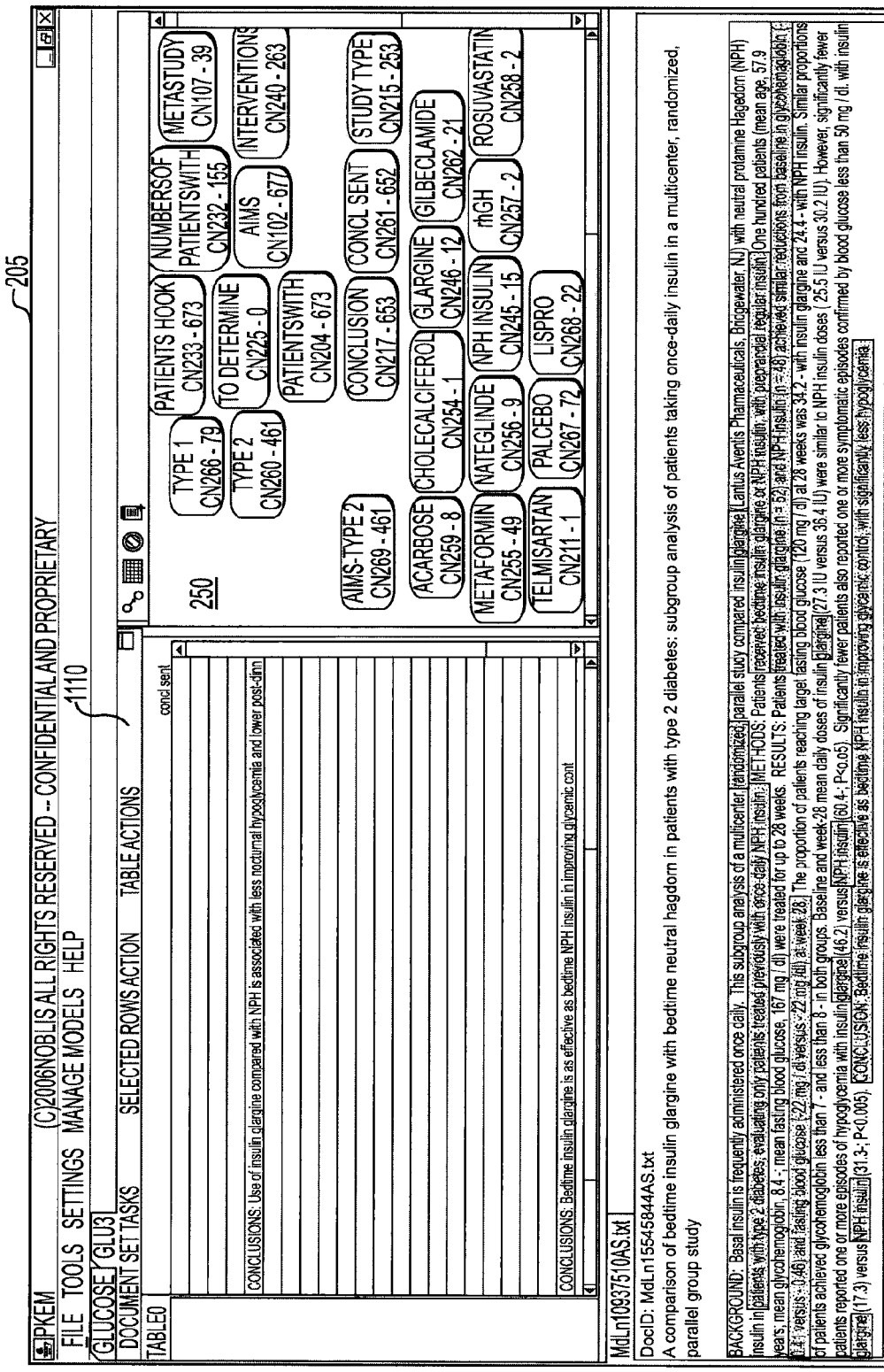

As the user creates and manages model 250, he or she may at any time view documents from document set 210 using PIEM tool 205. FIGS. 32-33 illustrate exemplary user interface displays consistent with embodiments of the present invention that allow a user to review selected documents individually in document window 1700. As shown in FIGS. 32-33, a user may select a specific document in results table 1110, and the document, or a relevant excerpt from the document, will appear in document window 1700. Portions of the document in window 1700 may indicate where a selected concept appears in the document.

Figure 34:
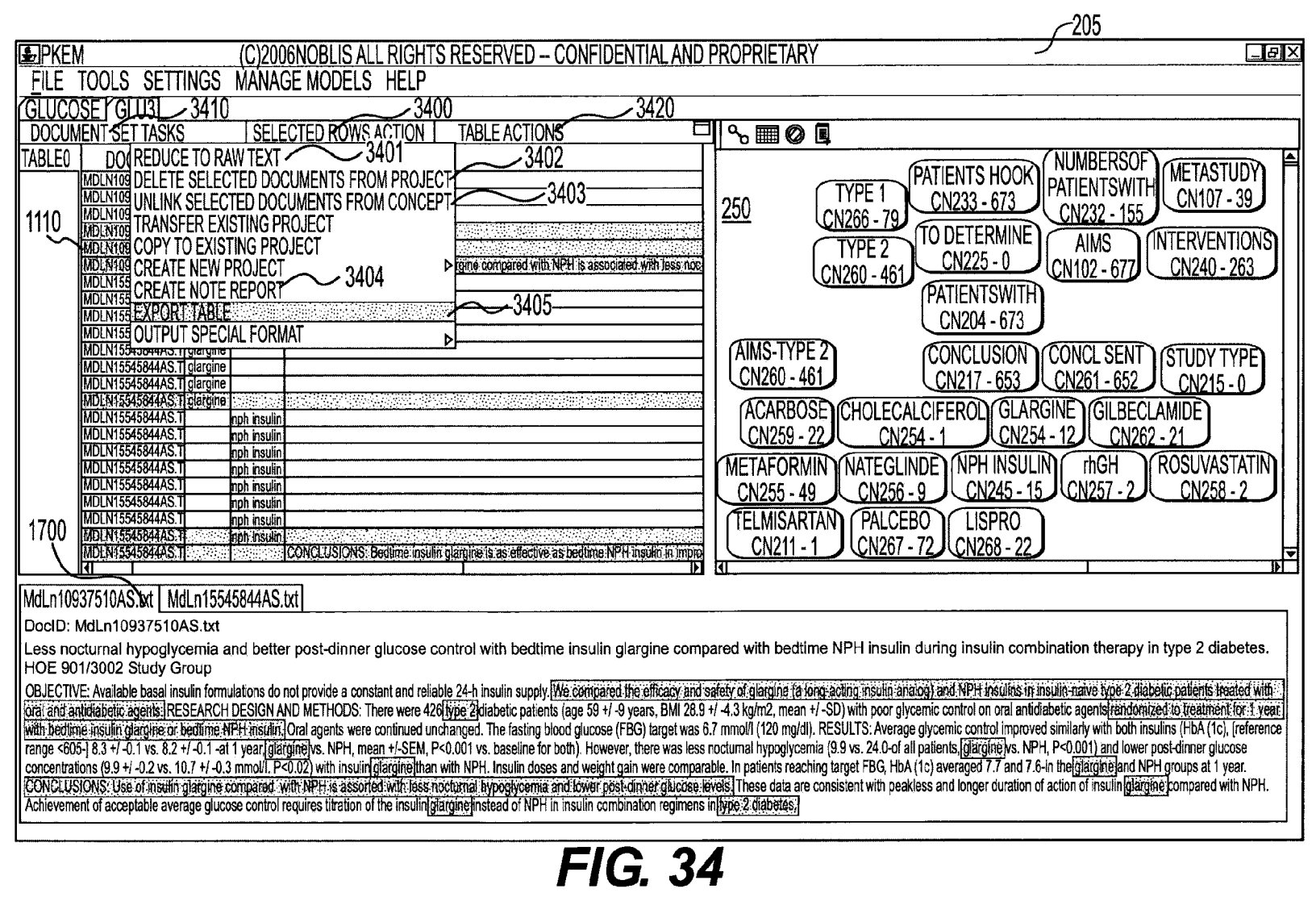

FIG. 34 illustrates an exemplary user interface display consistent with an embodiment of the present invention for exporting information from PIEM tool 205. A user may export model 250 or any subset of information from model 250 using PIEM tool 205. In the example shown in FIG. 34, the user may select various rows of results table 1110, navigate to menu 3400 "Selected Rows Action", and select from menu options such as "Reduce to Raw Text" 3401, "Delete Selected Documents from Project" 3402, "Unlink Selected Documents from Concept" 3403, "Create Note Report 3404," and "Export Table" 3405. The user may select option "Export Table" 3405 to export selected rows of the table as a tab-separated file to pass to a colleague, for example, or may select option "Reduce to Raw Text" 3401 to save the selected rows of the table to a raw text file on a local computer. Alternatively or additionally, the user may select options from menu "Document Set Tasks" 3410 to export or save document sets, or may select options from menu "Table Actions" 3420 to export or save tables.

Other embodiments of the invention will be apparent to those skilled in the art from consideration of the specification and practice of the invention disclosed herein. It is intended that the specification and examples be considered as exemplary only. For example, a public website may serve for the exchange of models, where people share, trade, buy, or sell models on the website. The website may collect not only models, but also references to documents that a contributor used in developing a model. An owner of the website would be in a position to reconstitute projects using models and document references to build a mapping that maps document sets to models. This mapping could be used in a "matchmaking" service, such that if a person input a set of document references, the website could suggest well-matched models. If a person input a model, the site could suggest a well-matched set of document references. Server-based versions of the technology make it easy for teams to share and work on the same projects. All of the algorithms for extraction and analysis may use a computing cluster, for example, to manage extremely large data sets or to accelerate processing. Further, graphical representation of data (pie charts, graphs, histograms, etc.) is also possible using the PIEM tool. Using the PIEM tool to create a model that becomes a step in a data pipeline (e.g., commit extracted data to specific fields in a database) leverages the power of any existing database. The PIEM tool may also include a "create database" plug-in that may automatically create a database for a model, so that the user receives a database that is customized to the model.

I claim:

1. A method for extracting information from a set of documents, the method comprising:
receiving a set of documents;
receiving a first concept, the first concept representing first information for extraction from the set of documents, wherein the first concept comprises a plurality of trigger phrases related to the first concept;
updating the first concept into a first subset and a second subset, the first subset comprising one or more of the plurality of trigger phrases of the first concept, the second subset comprising remaining trigger phrases of the plurality of trigger phrases of the first concept;
creating a second concept based on the first concept, the second concept having a definitional dependency from the first concept, the definitional dependency providing a contextual relationship to the second concept such that the second concept represents second information within a context of the first information;
updating the second concept into a third concept and a fourth concept, the third concept depending on the first subset of the first concept, the fourth concept depending on the second subset of the first concept;
selecting the second concept; and
based on the selection of the second concept, extracting from the set of documents, the second information within the context of the first information.

2. The method of claim 1, wherein the second information within a context of the first information comprises the second information in a contiguous block of text in proximity of the first information.

3. The method of claim 1, wherein the second information within a context of the first information comprises the second information in a subset of the set of documents containing the first information.

4. The method of claim 1, wherein the second information within a context of the first information comprises the second information in a section of a document in the set of documents, the section containing the first information.

5. The method of claim 1, further comprising:
receiving a change to the first concept; and
updating the second concept to reflect the change to the first concept using the definitional dependency.

6. The method of claim 1, further comprising:
based on a selection of the third concept, extracting from the set of documents, the second information within a context of the first subset of the first concept.

7. The method of claim 1, further comprising:
based on a selection of the fourth concept, extracting from the set of documents, the second information within a context of the second subset of the first concept.

8. The method of claim 1, further comprising:
creating a fifth concept based on the second concept, the fifth concept representing third information within a context of the second information within the context of the first information; and
based on a selection of the fifth concept, extracting from the set of documents, the third information within the context of the second information within the context of the first information.

9. A system for extracting information from a set of documents, comprising:
a memory; and
a processor configured to:
receive a set of documents;
receive a first concept, the first concept representing first information for extraction from the set of documents, wherein the first concept comprises a plurality of trigger phases related to the first concept;
update the first concept into a first subset and a second subset, the first subset comprising one or more of the plurality of trigger phrases of the first concept, the second subset comprising remaining trigger phrases of the plurality of trigger phrases of the first concept;
create a second concept based on the first concept, the second concept having a definitional dependency from the first concept, the definitional dependency providing a contextual relationship to the second concept such that the second concept represents second information within a context of the first information;
update the second concept into a third concept and a fourth concept, the third concept depending on the first subset of the first concept, the fourth concept depending on the second subset of the first concept;

select the second concept; and
  based on the selection of the second concept, extract from the set of documents, the second information within the context of the first information.

10. The system of claim 9, wherein the second information within a context of the first information comprises the second information in a contiguous block of text in proximity of the first information.

11. The system of claim 9, wherein the second information within a context of the first information comprises the second information in a subset of the set of documents containing the first information.

12. The system of claim 9, wherein the second information within a context of the first information comprises the second information in a section of a document in the set of documents, the section containing the first information.

13. The system of claim 9, wherein the processor is further configured to:
  receive a change to the first concept; and
  update the second concept to reflect the change to the first concept using the definitional dependency.

14. The system of claim 9, wherein the processor is further configured to:
  based on a selection of the third concept, extract from the set of documents, the second information within a context of the first subset of the first concept; and
  based on a selection of the fourth concept, extract from the set of documents, the second information within a context of the second subset of the first concept.

15. The system of claim 9, wherein the processor is further configured to:
  create a fifth concept, the fifth concept defining the third information within a context of the second information within the context of the first information; and
  based on a selection of the fifth concept, extract from the set of documents, the third information within a context of the second information within the context of the first information.

16. A non-transitory computer-readable medium encoded with instructions which, when executed by a computer, perform a method for extracting information from a set of documents, the method comprising:
  receiving a set of documents;
  receiving a first concept, the first concept representing first information for extraction from the set of documents, wherein the first concept comprises a plurality of trigger phrases related to the first concept;
  updating the first concept into a first subset and a second subset, the first subset comprising one or more of the plurality of trigger phrases of the first concept, the second subset comprising remaining trigger phrases of the plurality of trigger phrases of the first concept;
  creating a second concept based on the first concept, the second concept having a definitional dependency from the first concept, the definitional dependency providing a contextual relationship to the second concept such that the second concept represents second information within a context of the first information;
  updating the second concept into a third concept a fourth concept, the third concept depending on the first subset of the first concept, the fourth concept depending on the second subset of the first concept;
  selecting the second concept; and
  based on the selection of the second concept, extracting from the set of documents, the second information within the context of the first information.

17. The non-transitory computer-readable medium of claim 16, the method further comprising:
  based on a selection of the third concept, extracting from the set of documents, the second information within a context of the first subset of the first concept; and
  based on a selection of the fourth concept, extracting from the set of documents, the second information within a context of the second subset of the first concept.

\* \* \* \* \*